United States Patent
Matsusue et al.

(10) Patent No.: US 11,283,089 B2
(45) Date of Patent: Mar. 22, 2022

(54) FUEL CELL SYSTEM AND CONTROL METHOD THEREOF

(71) Applicant: TOYOTA JIDOSHA KABUSHIKI KAISHA, Toyota (JP)

(72) Inventors: Masaaki Matsusue, Mishima (JP); Masanori Aimu, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 370 days.

(21) Appl. No.: 16/185,756

(22) Filed: Nov. 9, 2018

(65) Prior Publication Data

US 2019/0081339 A1     Mar. 14, 2019

Related U.S. Application Data

(62) Division of application No. 14/414,774, filed as application No. PCT/IB2013/002153 on Sep. 30, 2013, now Pat. No. 10,158,134.

(30) Foreign Application Priority Data

Oct. 17, 2012  (JP) ................................ 2012-229641

(51) Int. Cl.
| | | |
|---|---|---|
| *H01M 8/04746* | (2016.01) | |
| *H01M 8/04089* | (2016.01) | |
| *H01M 8/04828* | (2016.01) | |
| *H01M 8/0438* | (2016.01) | |
| *H01M 8/04537* | (2016.01) | |

(Continued)

(52) U.S. Cl.
CPC ... *H01M 8/04753* (2013.01); *H01M 8/04089* (2013.01); *H01M 8/04395* (2013.01); *H01M 8/04611* (2013.01); *H01M 8/04619* (2013.01); *H01M 8/04828* (2013.01); *H01M 16/006* (2013.01); *H01M 8/04992* (2013.01)

(58) Field of Classification Search
CPC ......... H01M 8/04753; H01M 8/04089; H01M 8/04395
See application file for complete search history.

(56) References Cited

U.S. PATENT DOCUMENTS

| | | |
|---|---|---|
| 2002/0022161 A1 | 2/2002 | Kurosaki et al. |
| 2008/0081225 A1 | 4/2008 | Arthur et al. |
| 2009/0017350 A1 | 1/2009 | Umayahara |

(Continued)

FOREIGN PATENT DOCUMENTS

| | | |
|---|---|---|
| DE | 102005038455 A1 | 2/2007 |
| DE | 102007046058 B4 | 3/2021 |

(Continued)

*Primary Examiner* — Nathanael T Zemui
(74) *Attorney, Agent, or Firm* — Hunton Andrews Kurth LLP

(57) ABSTRACT

A fuel cell system includes: a fuel cell; an oxidant gas supply unit configured to supply an oxidant gas to a cathode electrode of the fuel cell; and a gas pressure control unit configured to detect as a gas pressure sensitivity a ratio of variation in an output of the fuel cell to variation in the pressure of the oxidant gas, specify a correspondence relationship between the pressure of the oxidant gas and the output of the fuel cell on the basis of the detected gas pressure sensitivity, and control the pressure of the oxidant gas on the basis of the specified correspondence relationship.

8 Claims, 15 Drawing Sheets

(51) Int. Cl.
  *H01M 16/00*     (2006.01)
  *H01M 8/04992*   (2016.01)

(56) References Cited

U.S. PATENT DOCUMENTS

| | | | | |
|---|---|---|---|---|
| 2009/0110987 A1* | 4/2009 | Kagami | ............ | H01M 8/04753 |
| | | | | 429/429 |
| 2009/0169927 A1* | 7/2009 | Sato | .................. | H01M 8/04395 |
| | | | | 429/412 |
| 2010/0248054 A1 | 9/2010 | Umayahara et al. | | |

FOREIGN PATENT DOCUMENTS

| | | |
|---|---|---|
| JP | 2002-042839 A | 2/2002 |
| JP | 2002-246051 A | 8/2002 |
| JP | 2006-147234 A | 6/2006 |
| JP | 2006-310217 A | 11/2006 |
| JP | 2010-267516 A | 11/2010 |
| JP | 2011-029158 A | 2/2011 |

\* cited by examiner

FUEL CELL SYSTEM AND CONTROL METHOD THEREOF

CROSS-REFERENCE TO RELATED APPLICATIONS

This is a divisional application of U.S. patent application Ser. No. 14/414,774, filed Jan. 14, 2015 which is a national phase application based on the PCT International Patent Application No. PCT/IB2013/002153 filed Sep. 30, 2013, claiming priority to Japanese Patent Application No. 2012-229641 filed Oct. 17, 2012, the entire contents of all which are incorporated herein by reference.

BACKGROUND OF THE INVENTION

1. Field of the Invention

The invention relates to a fuel cell system including a fuel cell, and a control method for the fuel cell system.

2. Description of Related Art

A fuel cell system which, in response to Modification of an amount of power generated by a fuel cell, controls an air flow rate on a cathode inlet side to a target air flow rate corresponding to a required power generation amount and controls an air pressure on the cathode inlet side is available in the related art (Japanese Patent Application Publication No. 2002-42839 (JP-2002-42839 A)). The air pressure on the cathode inlet side is controlled by adjusting an opening of a back pressure control valve provided on a cathode outlet side (JP-2002-42839 A and Japanese Patent Application Publication No. 2011-29158 (JP-2011-29158 A)).

In the related art, however, sufficient consideration has not been given to control performed in a case where the amount of power generated by the fuel cell decreases due to a reduction in a surface area of platinum serving as an electrode catalyst accompanying use of the fuel cell.

SUMMARY OF THE INVENTION

The invention provides a fuel cell system and a control method thereof with which the fuel cell system can be controlled in accordance with a reduction in a surface area of platinum serving as an electrode catalyst.

A first aspect of the invention is a fuel cell system including: a fuel cell; an oxidant gas supply unit configured to supply an oxidant gas to a cathode electrode of the fuel cell; and a gas pressure control unit configured to detect as a gas pressure sensitivity a ratio of variation in an output of the fuel cell to variation in the pressure of the oxidant gas, specify a correspondence relationship between the pressure of the oxidant gas and the output of the fuel cell on the basis of the detected gas pressure sensitivity, and control the pressure of the oxidant gas on the basis of the specified correspondence relationship.

With the fuel cell system according to this aspect, when a surface area of platinum serving as an electrode catalyst of the cathode electrode decreases during use of the fuel cell, leading to a reduction in the output of the fuel cell, the pressure of the oxidant gas can be controlled while taking the gas pressure sensitivity into consideration, and therefore a required output can be secured more reliably. Hence, with the fuel cell system according to this aspect, a high power generation performance can be obtained.

The gas pressure control unit may be configured to obtain a required output required of the fuel cell, calculate as a target gas pressure a pressure of the oxidant gas corresponding to the required output by comparing the required output with the correspondence relationship, and control the pressure of the oxidant gas to the target gas pressure. According to this configuration, the pressure of the oxidant gas can be controlled easily, and as a result, an even higher power generation performance can be obtained.

The fuel cell system may further include a storage unit storing table data in which correspondence relationships between the pressure of the oxidant gas and the output of the fuel cell are respectively associated with individual values of the gas pressure sensitivity, and the gas pressure control unit maybe configured to specify the correspondence relationship between the pressure of the oxidant gas and the output of the fuel cell by selecting the correspondence relationship that corresponds to the detected gas pressure sensitivity from the table data. According to this configuration, the correspondence relationship between the pressure of the oxidant gas and the output of the fuel cell can be specified quickly.

The fuel cell system may further include a back pressure regulating valve configured to regulate the pressure of the oxidant gas discharged from a cathode electrode outlet of the fuel cell, and the gas pressure control unit maybe configured to control the pressure of the oxidant gas by adjusting an opening of the back pressure regulating valve. According to this configuration, by controlling the pressure (a back pressure) of the oxidant gas discharged from the cathode electrode outlet, the oxidant gas can be controlled with a high degree of responsiveness.

The gas pressure control unit may be configured to detect the gas pressure sensitivity and specify the correspondence relationship between the pressure of the oxidant gas and the output of the fuel cell at a timing for starting to increase the pressure of the oxidant gas. According to this configuration, the required output can be obtained with a high degree of responsiveness when a request to increase the output of the fuel cell is issued.

The gas pressure control unit may detect the gas pressure sensitivity and specify the correspondence relationship between the pressure of the oxidant gas and the output of the fuel cell at a timing where a load of the fuel cell starts to shift to an operating point having a predetermined load. According to this configuration, when a high load request or a low load request is issued, an output corresponding to the high load request or the low load request can be obtained with a high degree of responsiveness.

The fuel cell may include an electrode catalyst, the correspondence relationship between the pressure of the oxidant gas and the output of the fuel cell may include a first correspondence relationship and a second correspondence relationship, the second correspondence relationship being set such that a magnitude of the pressure of the oxidant gas in the second correspondence relation ship, corresponding to an identical output of the fuel cell, is greater than that a magnitude of the pressure of the oxidant gas in the first correspondence relation ship, and the gas pressure control unit may specify the correspondence relationship by selecting the first correspondence relationship when the fuel cell is not in a predetermined operating condition in which a utilization rate of platinum contained in the electrode catalyst decreases, and selecting the second correspondence relationship when the fuel cell is in the predetermined operating condition. According to this configuration, the required output can be obtained more reliably even in an operating condition where the utilization rate of the platinum has decreased.

The predetermined operating condition may be a flooded condition of the fuel cell. According to this configuration, the required output can be secured more reliably even when the fuel cell is in a flooded condition.

The predetermined operating condition may be an idling condition of the fuel cell. According to this configuration, the required output can be secured more reliably even when the fuel cell is in an idling condition.

The fuel cell system may further include a non-volatile memory configured to continue to store the correspondence relationship between the pressure of the oxidant gas and the output of the fuel cell, specified by the gas pressure control unit, after a power supply of the fuel cell system has been switched OFF, and the gas pressure control unit may be configured to control the pressure of the oxidant gas within a predetermined period on the basis of the correspondence relationship stored in the non-volatile memory. According to this configuration, a processing responsiveness can be increased.

The fuel cell system may further include a flooding determination unit configured to determine whether or not flooding has occurred in the fuel cell by comparing a specific gas pressure sensitivity determined from the correspondence relationship between the pressure of the oxidant gas and the output of the fuel cell, specified by the gas pressure control unit, with an actual gas pressure sensitivity derived from an actual pressure of the oxidant gas and an actual output of the fuel cell, and comparing a specific output absolute value that is an absolute value of the output to which the specific gas pressure sensitivity corresponds with an actual output absolute value. According to this configuration, the occurrence of flooding can be detected with a high degree of precision.

When the flooding determination unit determines that flooding has occurred, the flooding determination unit maybe configured to execute processing for avoiding the flooding. According to this configuration, flooding can be avoided, and as a result, the power generation performance can be further improved.

The fuel cell system may further include a battery, and a gas flow rate control unit configured to control a flow rate of the oxidant gas such that when the gas pressure control unit controls the pressure of the oxidant gas while the battery is in a predetermined condition, the output of the fuel cell reaches the required output at an earlier timing than a timing at which the pressure of the oxidant gas reaches the target gas pressure. According to this configuration, a power increase generated when the output of the fuel cell reaches the required output at an earlier timing than a timing at which the pressure of the oxidant gas reaches the target gas pressure can be allocated to an amount of power required to improve the condition of the battery, and therefore a balance between demand and supply of power can be maintained throughout the entire fuel cell system.

The fuel cell system may further include a SOC detection unit configured to detect a state of charge (SOC) of the battery, and the battery may be determined to be in the predetermined condition when the detected SOC deviates from a predetermined range. According to this configuration, a balance between demand and supply of power can be maintained throughout the entire fuel cell system when the SOC of the battery deviates from the appropriate range.

The fuel cell system may further include a gas flow rate control unit configured to control a flow rate of the oxidant gas such that when the gas pressure control unit controls the pressure of the oxidant gas while the fuel cell is in a predetermined condition, the output of the fuel cell reaches the required output at an earlier timing than a timing at which the pressure of the oxidant gas reaches the target gas pressure. According to this configuration, a power increase generated when the output of the fuel cell reaches the required output at the earlier timing can be allocated to an amount of power required to improve the condition of the fuel cell, and therefore a balance between demand and supply of power can be maintained throughout the entire fuel cell system.

The fuel cell may be determined to be in the predetermined condition when flooding occurs in the fuel cell. According to this configuration, a balance between demand and supply of power can be maintained throughout the entire fuel cell system when the fuel cell is in the flooded condition.

A second aspect of the invention is a fuel cell system including: a fuel cell; an oxidant gas supply unit configured to supply an oxidant gas to a cathode electrode of the fuel cell; a gas pressure control unit configured to control a pressure of the oxidant gas; and a platinum surface area estimation unit configured to detect a ratio of variation in an output of the fuel cell to variation in the pressure of the oxidant gas as a gas pressure sensitivity, and estimate a platinum surface area of the cathode electrode on the basis of the detected gas pressure sensitivity. With the fuel cell system according to this aspect, the platinum surface area of the cathode electrode can be estimated with a high degree of precision.

A third aspect of the invention is a control method for a fuel cell system including a fuel cell and an oxidant gas supply unit configured to supply an oxidant gas to a cathode electrode of the fuel cell, including: detecting a ratio of variation in an output of the fuel cell to variation in a pressure of the oxidant gas as a gas pressure sensitivity; specifying a correspondence relationship between the pressure of the oxidant gas and the output of the fuel cell on the basis of the detected gas pressure sensitivity; and controlling the pressure of the oxidant gas on the basis of the specified correspondence relationship. With the control method for a fuel cell system according to this aspect, similarly to the fuel cell system according to the first aspect, the required output can be secured more reliably, and as a result, a high power generation performance can be obtained.

A fourth aspect of the invention is a control method for a fuel cell system including a fuel cell and an oxidant gas supply unit configured to supply an oxidant gas to a cathode electrode of the fuel cell, including: controlling a pressure of the oxidant gas; detecting a ratio of variation in an output of the fuel cell to variation in the pressure of the oxidant gas as a gas pressure sensitivity; and estimating a platinum surface area of the cathode electrode on the basis of the detected gas pressure sensitivity. With the control method for a fuel cell system according to this aspect, similarly to the fuel cell system according to the second aspect, the platinum surface area of the cathode electrode can be estimated with a high degree of precision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

As noted above, in the related art, sufficient consideration has not been given to control performed in a case where an amount of power generated by a fuel cell decreases due to a reduction in a surface area of platinum serving as an electrode catalyst accompanying use of the fuel cell. It may therefore be impossible to obtain a high power generation performance by performing control such as that described in JP-2002-42839 A. It is also difficult to secure a required power generation amount. Moreover, a responsiveness of air pressure control is low. In addition, demand exists for an improvement in drivability when a fuel cell system is installed in a vehicle, reductions in a size and a cost of the fuel cell system, a reduction in an amount of consumed natural resources, simplification of a manufacturing process, an improvement in user-friendliness, and so on.

The invention can solve at least a part of the problems described above by making it possible to control a fuel cell system in accordance with a reduction in a surface area of platinum serving as an electrode catalyst.

Next, embodiments of the invention will be described.

First Embodiment

Figure 1:
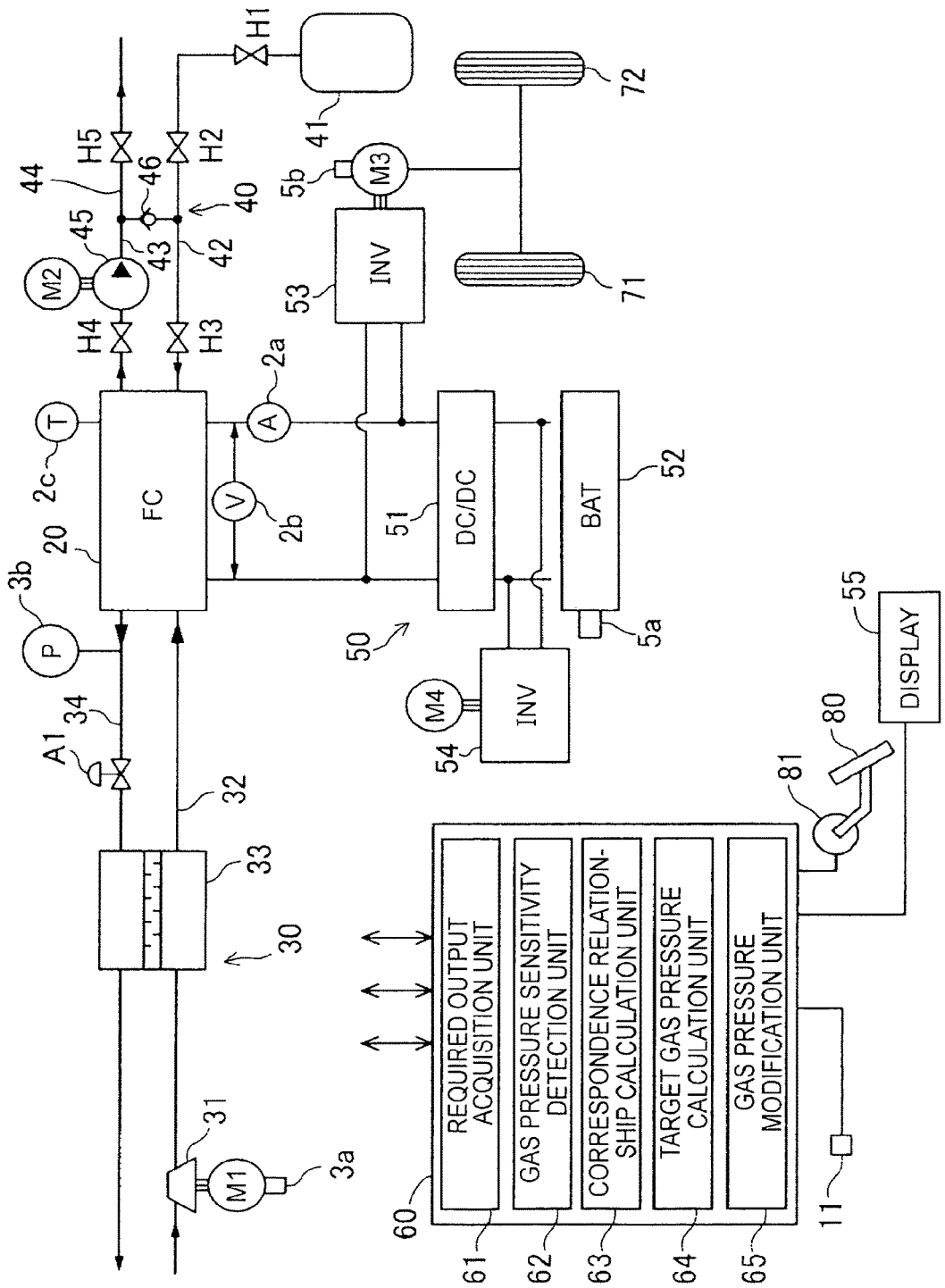
FIG. 1 is an illustrative view showing a configuration of a fuel cell system serving as a first embodiment of the invention.

FIG. 1 is an illustrative view showing a configuration of a fuel cell system 10 serving as a first embodiment of the invention. In this embodiment, the invention is applied to an in-vehicle power generation system for a fuel cell vehicle. As shown in FIG. 1, the fuel cell system 10 includes a fuel cell (FC) 20 that performs power generation upon reception of a supply of an oxidant gas and a fuel gas, and generates electric power through the power generation, an oxidant gas pipe system 30 that supplies air serving as the oxidant gas to the fuel cell 20, a fuel gas pipe system 40 that supplies hydrogen gas serving as the fuel gas to the fuel cell 20, an electric power system 50 that charges and discharges electric power to and from the system, a control unit 60 that performs overall control of the entire system, and so on.

The fuel cell 20 is a solid polymer electrolyte type fuel cell, and has a stacked structure in which a large number of single cells are stacked. Each single cell of the fuel cell 20 has a cathode electrode (an air electrode) and an anode electrode (a fuel electrode) on respective surfaces of an electrolyte constituted by an ion exchange membrane. A porous carbon material, for example, is used as a base for the electrodes including the cathode electrode and the anode electrode, and platinum Pt is used as a catalyst for the electrodes (an electrode catalyst). Further, a pair of separators are provided to sandwich the cathode electrode and the anode electrode from either side. The fuel gas is supplied to a fuel gas flow passage in one of the separators, and the oxidant gas is supplied to an oxidant gas flow passage in the other separator. As a result of this gas supply, the fuel cell 20 generates electric power.

A current sensor 2a that detects a current (an output current) during power generation, a voltage sensor 2b that detects a voltage, and a temperature sensor 2c that detects a temperature of the fuel cell 20 are attached to the fuel cell 20.

The oxidant gas pipe system 30 includes an air compressor 31, an oxidant gas supply passage 32, a humidification module 33, a cathode off-gas flow passage 34, a motor M1 that drives the air compressor 31, and so on.

The air compressor 31 is driven by driving force from the motor M1, which is activated by a control command from the control unit 60, to compress oxygen (oxidant gas) taken in from outside air via an air filter, not shown in the drawing, and supply the compressed oxygen to the cathode electrode of the fuel cell 20. A rotation speed detection sensor 3a that detects a rotation speed (a rotation speed per predetermined time; likewise hereafter) of the motor M1 is attached to the motor M1. The oxidant gas supply passage 32 is a gas flow passage for leading the oxygen supplied from the air compressor 31 to the cathode electrode of the fuel cell 20. Cathode off-gas is discharged from the cathode electrode of the fuel cell 20 through the cathode off-gas flow passage 34. The cathode off-gas contains off-gas of the oxygen after contributing to a cell reaction in the fuel cell 20. The cathode off-gas contains moisture generated by the cell reaction in the fuel cell 20, and is therefore in a condition of high humidity.

The humidification module 33 humidifies the oxidant gas supplied to the fuel cell 20 appropriately by performing moisture exchange between the low humidity oxidant gas flowing through the oxidant gas supply passage 32 and the high humidity cathode off-gas flowing through the cathode off-gas flow passage 34. The cathode off-gas flow passage 34 is a gas flow passage for discharging the cathode off-gas to the exterior of the system, and a back pressure regulating valve A1 is disposed near a cathode electrode outlet of the gas flow passage. A pressure (to be referred to hereafter as a "cathode back pressure") of the oxidant gas discharged from the fuel cell 20 is regulated by the back pressure regulating valve A1. A pressure sensor 3b that detects the cathode back pressure is attached to the cathode off-gas flow passage 34 between the fuel cell 20 and the back pressure regulating valve A1.

The fuel gas pipe system 40 includes a fuel gas supply source 41, a fuel gas supply passage 42, a fuel gas recirculation passage 43, an anode off-gas flow passage 44, a hydrogen circulating pump 45, a check valve 46, a motor M2 for driving the hydrogen circulating pump 45, and so on:

The fuel gas supply source 41 supplies the fuel gas such as hydrogen gas to the fuel cell 20, and is constituted by a high pressure hydrogen tank, a hydrogen storage tank, or the like, for example. The fuel gas supply passage 42 is a gas flow passage for leading the fuel gas released from the fuel gas supply source 41 to the anode electrode of the fuel cell 20, and valves such as a tank valve H1, a hydrogen supply valve H2, and an FC inlet valve H3 are disposed in the gas flow passage in order from an upstream side to a downstream side. The tank valve H1, the hydrogen supply valve H2, and the FC inlet valve H3 are shut-off valves for supplying (or cutting off the supply of) the fuel gas to the fuel cell 20, and are constituted by solenoid valves, for example.

The fuel gas recirculation passage 43 is a feedback gas flow passage for recirculating unreacted fuel gas to the fuel cell 20, and an FC outlet valve H4, the hydrogen circulating pump 45, and the check valve 46 are disposed in the gas flow passage in order from an upstream side to a downstream side. Low pressure unreacted fuel gas discharged from the fuel cell 20 is pressurized appropriately by the hydrogen circulating pump 45, which is driven by driving force from the motor M2 activated by a control command from the control unit 60, and led to the fuel gas supply passage 42. Backflow of the fuel gas from the fuel gas supply passage 42 to the fuel gas recirculation passage 43 is suppressed by the check valve 46. The anode off-gas flow passage 44 is a gas flow passage for discharging anode off-gas containing hydrogen off-gas discharged from the fuel cell 20 to the exterior of the system, and a purge valve H5 is disposed in the gas flow passage.

The electric power system 50 includes a high pressure direct current/direct current (DC/DC) converter 51, a battery 52, a traction inverter 53, an accessory inverter 54, a traction motor M3, an accessory motor M4, and so on.

The high pressure DC/DC converter 51 is a direct current voltage converter having a function for regulating a direct current voltage input therein from the battery 52 and outputting the regulated direct current voltage to the traction inverter 53, and a function for regulating a direct current voltage input therein from the fuel cell 20 or the traction motor M3 and outputting the regulated direct current voltage to the battery 52. Charging and discharging of the battery 52 is realized by these functions of the high pressure DC/DC converter 51. Further, an output voltage of the fuel cell 20 is controlled by the high pressure DC/DC converter 51.

The battery 52 is a chargeable/dischargeable secondary battery. Various types of secondary batteries, for example a nickel hydrogen battery or the like, may be used. The battery 52 can be charged with surplus power under the control of a battery computer, not shown in the drawing, and is also capable of supplying supplementary power. A part of the direct current power generated by the fuel cell 20 is boosted or stepped down by the high pressure DC/DC converter 51 and charged to the battery 52. A SOC sensor 5a that detects the SOC of the battery 52 is attached to the battery 52. Note that a chargeable/dischargeable storage device other than a secondary battery, such as a capacitor, for example, may be employed instead of the battery 52.

The traction inverter 53 and the accessory inverter 54 are pulse width modulation (PWM) inverters using a pulse width modulation system, which convert the direct current power output by the fuel cell 20 or the battery 52 into three phase alternating current power in response to a given control command, and supply the three phase alternating current power to the traction motor M3 and the accessory motor M4. The traction motor M3, an example of a load power source, is a motor (a vehicle driving motor) for driving vehicle wheels 71, 72. A rotation speed detection sensor 5b that detects a rotation speed of the traction motor M3 is attached to the traction motor M3. The accessory motor M4 is a motor for driving various accessories. the motor M1 that drives the air compressor 31, the motor M2 that drives the hydrogen circulating pump 45, and so on are collectively termed the accessory motor M4.

The control unit 60 is constituted by a central processing unit (CPU), a read only memory (ROM), a random access memory (RAM), and so on, and performs overall control of the respective parts of the system on the basis of input sensor signals. More specifically, the control unit 60 calculates a required power generation amount (to be referred to hereafter as a "required output") required of the fuel cell 20 on the basis of respective sensor signals transmitted from an accelerator pedal sensor 81 that detects rotation of an accelerator pedal 80, the SOC sensor 5a, the rotation speed detection sensors 3a, 5b, and so on.

The control unit 60 then controls an output voltage and an output current of the fuel cell 20 such that the fuel cell 20 generates the required output. Further, the control unit 60 controls the traction motor M3 and the accessory motor M4 by controlling output pulses and the like of the traction inverter 53 and the accessory inverter 54.

In the fuel cell 20, a platinum surface area decreases as a use time of the fuel cell 20 increases over time, and as a result, the output voltage decreases. In other words, when the surface area of the platinum on a cathode catalyst layer decreases as the use time of the fuel cell 20 increases, it becomes impossible to obtain a required output power from the fuel cell 20. Hence, the control unit 60 ensures that the required output power can be obtained by estimating the platinum surface area and controlling the back pressure regulating valve A1 in accordance with an estimation result. This control processing (cathode back pressure control processing) is realized by functions of a required output acquisition unit 61, a gas pressure sensitivity detection unit 62, a correspondence relationship calculation unit 63, a target gas pressure calculation unit 64, and a gas pressure modification unit 65. The respective units 61 to 65 will be described in detail below. The cathode back pressure control processing will now be described in detail.

Figure 2:
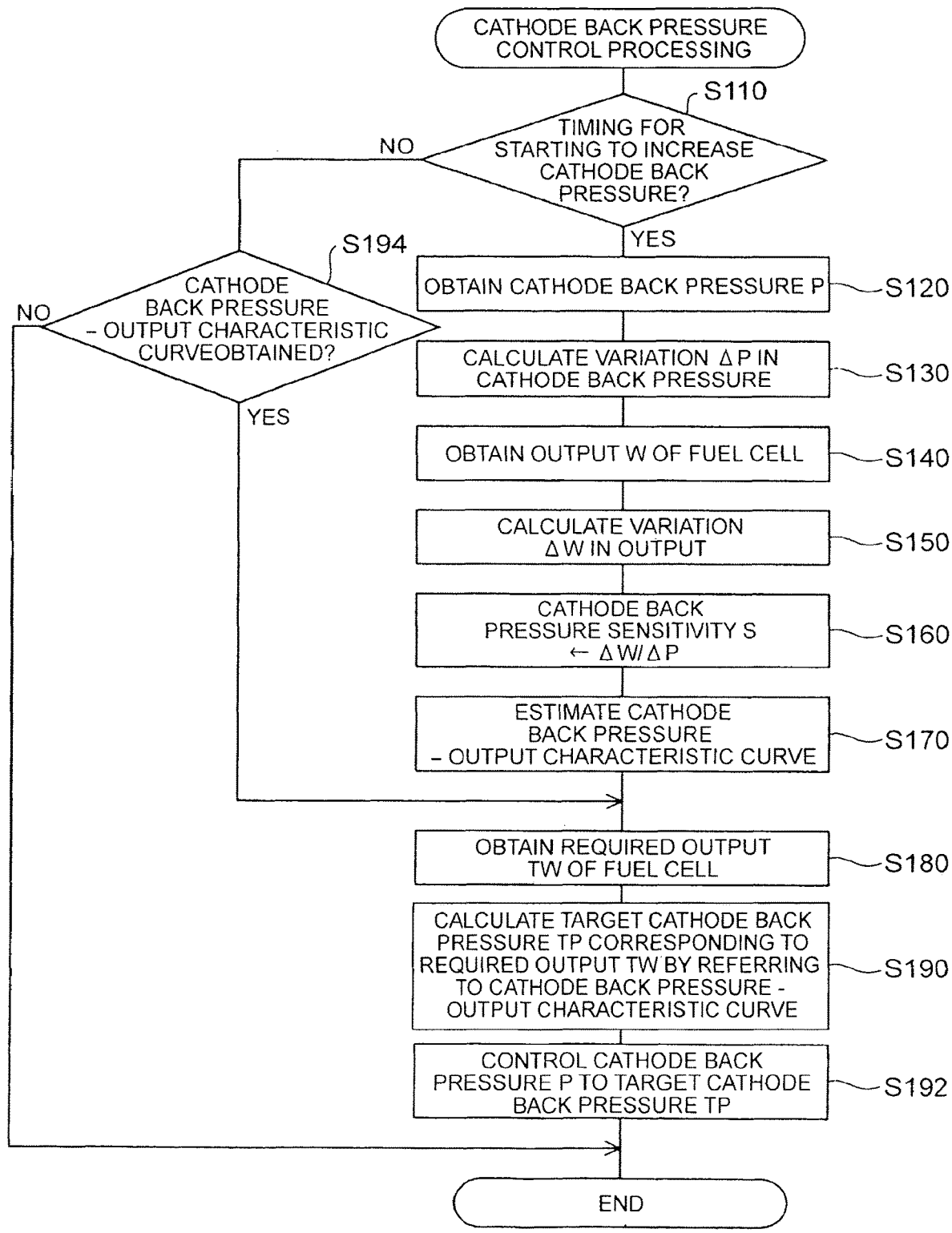
FIG. 2 is a flowchart showing cathode back pressure control processing executed by a control unit.

FIG. 2 is a flowchart showing the cathode back pressure control processing executed by the control unit 60. The cathode back pressure control processing is executed repeatedly at predetermined time intervals (every 10 msec, for example). When the processing begins, first, the control unit 60 determines whether or not a current time (a point in time at which the cathode back pressure control processing is executed) corresponds to a timing for starting to increase the cathode back pressure (a cathode back pressure increase timing) (step S110). When a driver issues a load request by depressing the accelerator pedal 80, an amount of oxidant gas supplied by the air compressor 31 is increased through control processing not shown in the drawings, leading to an increase in the cathode back pressure. Hence, in step S110, a determination is made as to whether or not the current time corresponds to the cathode back pressure increase timing.

When it is determined in step S110 that the current time corresponds to the cathode back pressure increase timing, the control unit 60 advances the processing to step S120, where processing is performed to obtain a cathode back pressure P from the pressure sensor 3b. Next, the control unit 60 calculates a variation $\Delta P$ in the cathode back pressure from a cathode back pressure obtained during the previous execution of the cathode back pressure control processing by subtracting the previous cathode back pressure from the cathode back pressure P obtained in step S110 (step S130).

Next, the control unit 60 obtains an output W of the fuel cell 20 (step S140). More specifically, the control unit 60 determines an output power as the output W by obtaining the current from the current sensor 2a and the voltage from the voltage sensor 2b, and multiplying the current by the voltage. Next, the control unit 60 calculates a variation $\Delta W$ in the output from an output obtained during the previous execution of the cathode back pressure control processing by subtracting the previous output from the obtained output W (step S150).

Next, the control unit 60 divides the variation $\Delta W$ in the output by the variation $\Delta P$ in the cathode back pressure, and stores a resulting quotient as a cathode back pressure sensitivity S (step S160). In other words, the cathode back pressure sensitivity S is stored in the RAM as a ratio of $\Delta W$ to $\Delta P$. Next, the control unit 60 performs processing to estimate a cathode back pressure—output characteristic curve on the basis of the cathode back pressure sensitivity S (step S170).

Figure 3:
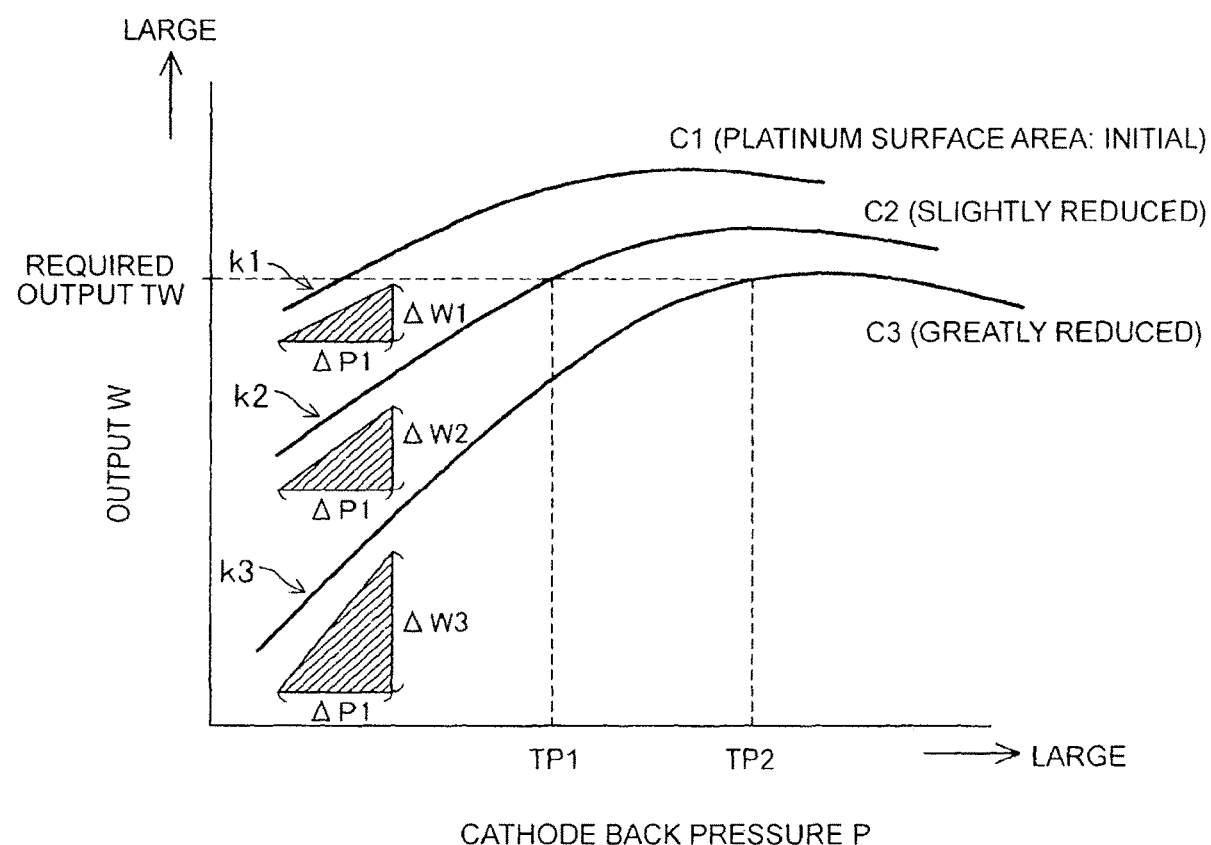
FIG. 3 is a graph showing a cathode back pressure—output characteristic curve.

FIG. 3 is a graph showing the cathode back pressure—output characteristic curve. As shown by the graph, when the cathode back pressure P is shown on the abscissa, the output W of the fuel cell 20 is shown on the ordinate, and the output W corresponding to the cathode back pressure P is mapped, a cathode back pressure—output characteristic curve indicated by a curve C1, for example, is obtained. The curve C1 and curves C2, C3 to be described below may be determined in advance by experiment or simulation. According to the curve C1, the output W increases as the cathode back pressure P increases, and after reaching a peak value, the output W decreases as the cathode back pressure P increases.

The curve C1 shows a case in which the platinum surface area of the cathode electrode is at a maximum, or in other words an initial operation in which there is no change in the condition of the electrode catalyst. When the use time of the fuel cell increases such that the platinum surface area decreases, the cathode back pressure—output characteristic curve varies from the curve C1 to the curve C2. On the curve C2, the output W is lower than on the curve C1 in all regions, and a difference in the output W relative to the curve C1 increases as the cathode back pressure P decreases. In other words, a slope k2 (=$\Delta W2/\Delta P1$) in a rise period of the curve C2 is larger than a slope k1 (=$\Delta W1/\Delta P1$) in the rise period of the curve C1.

The curve C3 shows a case in which the platinum surface area has decreased further from the curve C2. A slope k3 (=$\Delta W3/\Delta P1$) in the rise period of the curve C3 is larger than the slope k2 in the rise period of the curve C2. The "rise period" is a period in which the output W reaches a predetermined, proportion (90[%], for example) of the peak value, and the slope in this period takes the substantially constant values k1, k2, k3 on the respective curves C1, C2, C3. It is evident from the above that the cathode back pressure—output characteristic curve varies in shape according to a magnitude (an approximate magnitude) of the platinum surface area, and that the shape is determined according to the slope k1, k2, k3. The slope k1, k2, k3 takes a value obtained by dividing the variation $\Delta W$ in the output over the rise period of the characteristic curve (the curve) by the variation $\Delta P$ in the cathode back pressure, and corresponds to the cathode back pressure sensitivity S determined in step S160.

In this embodiment, the cathode back pressure increase timing is detected in step S110, and then, assuming that the cathode back pressure increase timing is included within the rise period, the processing for determining the cathode back pressure sensitivity S is performed in step S160 at the cathode back pressure increase timing. Next, the processing for estimating the cathode back pressure—output characteristic curve is performed on the basis of the cathode back pressure sensitivity S in step S170. More specifically, table data in which cathode back pressure—output characteristic curves are associated respectively with a plurality of slope values are stored in advance in the ROM of the control unit 60, and the CPU of the control unit 60 estimates the cathode back pressure—output characteristic curve by selecting a slope value corresponding to the cathode back pressure sensitivity S determined in step S160 from the table data and extracting the cathode back pressure—output characteristic curve associated with the slope value from the table data. Note that the number of cathode back pressure—output characteristic curves included in the table data is not necessarily limited to the three curves shown in the example of FIG. 3, and a larger number of curves may be provided. Further, the number of cathode back pressure—output characteristic curves included in the table data may be set at a specific number, and characteristic curves between adjacent characteristic curves may be obtained by an interpolation calculation.

Returning to FIG. 2, after executing step S170, the control unit 60 obtains a required output TW required of the fuel cell 20 (step S180). The required output TW corresponds to the aforesaid required power generation amount, and as described above, is calculated on the basis of the respective sensor signals transmitted from the accelerator pedal sensor 81, the SOC sensor 5a, the rotation speed detection sensors 3a, 5b, and so on.

Next, the control unit 60 refers to the cathode back pressure—output characteristic curve obtained in step S170 to calculate a target cathode back pressure TP corresponding to the required output TW obtained in step S140 (step S190). When, for example, the platinum surface area decreases slightly such that the cathode back pressure—output characteristic curve obtained in step S170 is the curve C2 in FIG. 3, the cathode back pressure P corresponding to the required output TW, obtained in step S140, on the curve C2 is determined as the target cathode back pressure TP (TP1 in the drawing). When, for example, the platinum surface area decreases greatly such that the cathode back pressure—output characteristic curve obtained in step S170 is the curve C3 in FIG. 3, the cathode back pressure P corresponding to the required output TW, obtained in step S140, on the curve C3 is determined as the target cathode back pressure TP (TP2 in the drawing).

After executing step S190, the control unit 60 controls the cathode back pressure P to the target cathode back pressure TP determined in step S190 by adjusting an opening of the back pressure regulating valve A1 (step S192). After executing step S192, the control unit 60 temporarily terminates the cathode back pressure control processing.

When it is determined in step S110 that the current time does not correspond to the cathode back pressure increase timing, on the other hand, the control unit 60 determines whether or not the cathode back pressure—output characteristic curve has been obtained (step S194). When it is determined here that the cathode back pressure—output characteristic curve has been obtained, the control unit 60 advances the processing to step S180, in which the control unit 60 calculates the target cathode back pressure TP in the manner described above using the cathode back pressure—output characteristic curve obtained in previous cathode back pressure control processing and the required output TW obtained during execution of the current cathode back pressure control processing, and controls the cathode back pressure P to the target cathode back pressure TP.

When it is determined in step S194 that the cathode back pressure—output characteristic curve has not been obtained, the cathode back pressure control processing is temporarily terminated.

The processing of step S180 in the cathode back pressure control processing configured as described above functions as the required output acquisition unit 61 (FIG. 1). Further, the processing of steps S120 to S160 functions as the gas pressure sensitivity detection unit 62 (FIG. 1), the processing of step S170 functions as the correspondence relationship calculation unit 63 (FIG. 1), the processing of step S190 functions as the target gas pressure calculation unit 64, and the processing of step S192 functions as the gas pressure modification unit 65.

In the fuel cell system 10 according to the first embodiment, configured as described above, the cathode back pressure sensitivity S is determined at the timing for starting to increase the cathode back pressure, whereupon the cathode back pressure—output characteristic curve is determined on the basis of the cathode back pressure sensitivity S. Thereafter, the required output TW is obtained during each operation, whereupon the cathode back pressure corresponding to the required output TW is calculated as the target cathode back pressure TP by comparing the required output TW with the determined cathode back pressure—output characteristic curve, and the cathode back pressure P is controlled to the target cathode back pressure TP. As described above, the cathode back pressure—output characteristic curve is determined in accordance with the magnitude of the platinum surface area of the cathode electrode. Therefore, the cathode back pressure—output characteristic curve indicates the cathode back pressure required to secure the required output TW not only when the platinum surface area has not decreased, but also when the output of the fuel cell 20 decreases due to a reduction in the platinum surface area resulting from use of the fuel cell. Hence, with the fuel cell system 10 according to the first embodiment, the required output TW can be secured more reliably, and as a result, the power generation performance can be improved. Furthermore, according to the fuel cell system 10, the cathode back pressure is controlled as the pressure of the oxidant gas, and therefore oxidant gas control can be performed with favorable responsiveness.

Second Embodiment

Figure 4:
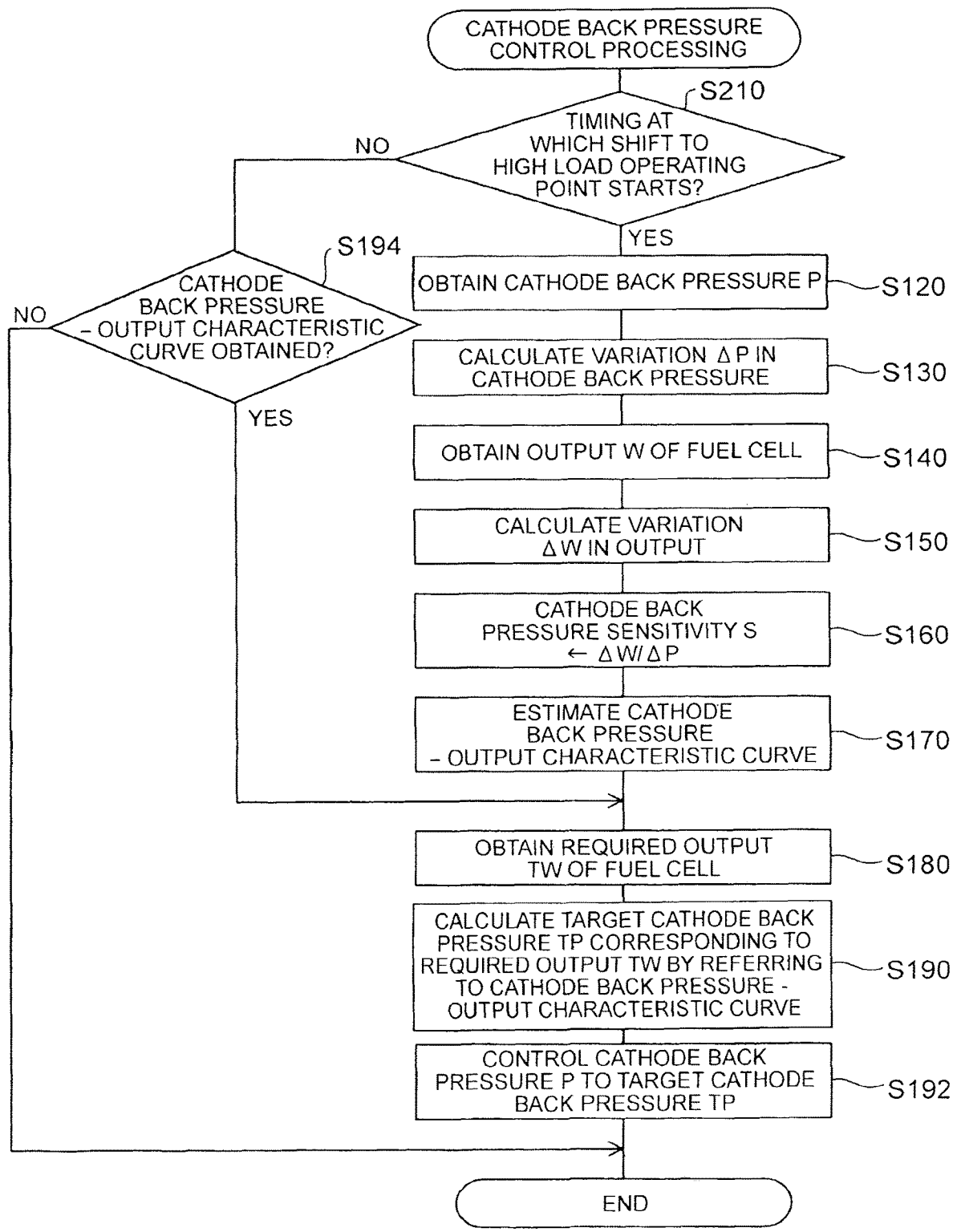
FIG. 4 is a flowchart showing cathode back pressure control processing according to a second embodiment.

FIG. 4 is a flowchart showing cathode back pressure control processing according to a second embodiment. A fuel cell system according to the second embodiment differs from the fuel cell system 10 according to the first embodiment only in the cathode back pressure control processing executed by the control unit. A hardware configuration of the second embodiment is identical to that of the first embodiment, and therefore, in the following description, identical reference symbols have been allocated to respective constituent elements.

The cathode back pressure control processing shown in FIG. 4 differs from the cathode back pressure control processing according to the first embodiment, shown in FIG. 2, in that the processing of step S110 in FIG. 2 is replaced with processing of step S210 in FIG. 4. The processing of the remaining steps S120 to S194 is identical. When the processing begins, the control unit 60 determines whether or not the current time (the point in time at which the cathode back pressure control processing is executed) corresponds to a timing at which a load of the fuel cell 20 starts to shift to a high load operating point (a high load shift timing) (step S210). More specifically, when the driver issues a high load request by depressing the accelerator pedal 80 forcefully, for example, the load of the fuel cell 20 shifts to the high load operating point. Here, the "high load 20' operating point" denotes a high load operating condition in which a current density of the fuel cell is at least 1 [$A/cm^2$], for example. When it is determined in step S210 that the current time corresponds to the high load shift timing, the processing advances to step S220, and when it is determined that the current time does not correspond to the high load shift timing, the processing advances to step S194.

Figure 5:
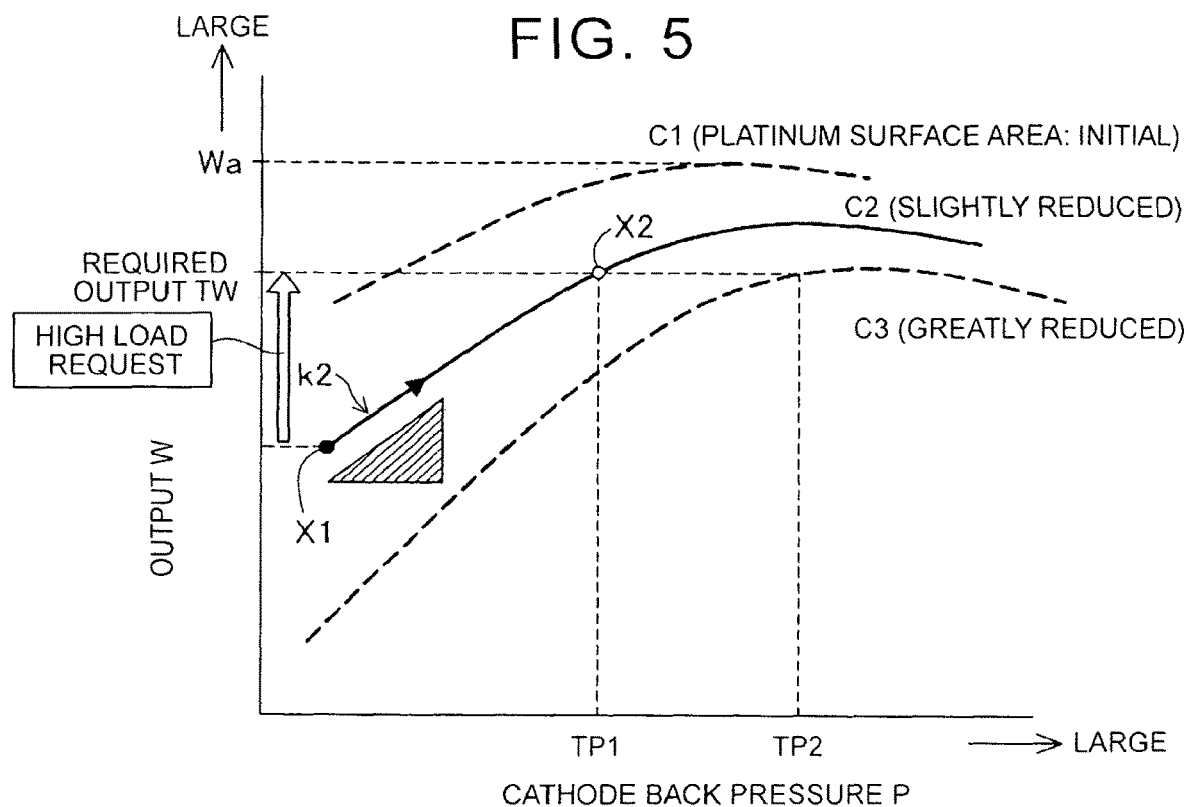
FIG. 5 is a graph showing a cathode back pressure—output characteristic curve according to the second embodiment.

FIG. 5 is a graph showing the cathode back pressure—output characteristic curve according to the second embodiment. In the fuel cell system according to the second embodiment, as shown in the drawing, when a high load request, i.e. a request to shift to a high load operating point X2, is received at a certain point X1, the cathode back pressure sensitivity S, i.e. the slope k2 of the curve, is determined at the high load shift timing at which shift to the high load operating point X2 begins. The cathode back pressure—output characteristic curve is then determined on the basis of the cathode back pressure sensitivity S. The cathode back pressure corresponding to the required output TW is then calculated as the target cathode back pressure TP using the cathode back pressure—output characteristic curve, whereupon the cathode back pressure P is controlled to the target cathode back pressure TP.

Hence, with the fuel cell system according to the second embodiment, similarly to the fuel cell system 10 according to the first embodiment, the required output TW can be secured more reliably, and as a result, the power generation performance can be improved. Moreover, a following effect is obtained. Typically, when the load of the fuel cell 20 is small, a rising slope of the cathode back pressure—output characteristic curve may not vary dramatically in accordance with the magnitude of the platinum surface area. In the fuel cell system according to the second embodiment, however, the cathode back pressure sensitivity S is calculated at the timing where the load of the fuel cell 20 starts to shift to the high load operating point, and therefore the rising slope of the cathode back pressure—output characteristic curve varies dramatically, making it easier to detect the cathode back pressure sensitivity S. As a result, a precision of the cathode back pressure sensitivity increases, enabling a further improvement in the power generation performance.

Note that in the second embodiment, the cathode back pressure sensitivity S is determined at the timing where the load of the fuel cell 20 begins to shift to the high load operating point, but instead, as a modified example of the second embodiment, the cathode back pressure sensitivity S may be determined at a timing where the load of the fuel cell 20 begins to shift to a low load operating point. Here, the "low load operating point" denotes a low load operating condition in which the current density of the fuel cell is no more than 0.1 [$A/cm^2$], for example.

Figure 6:
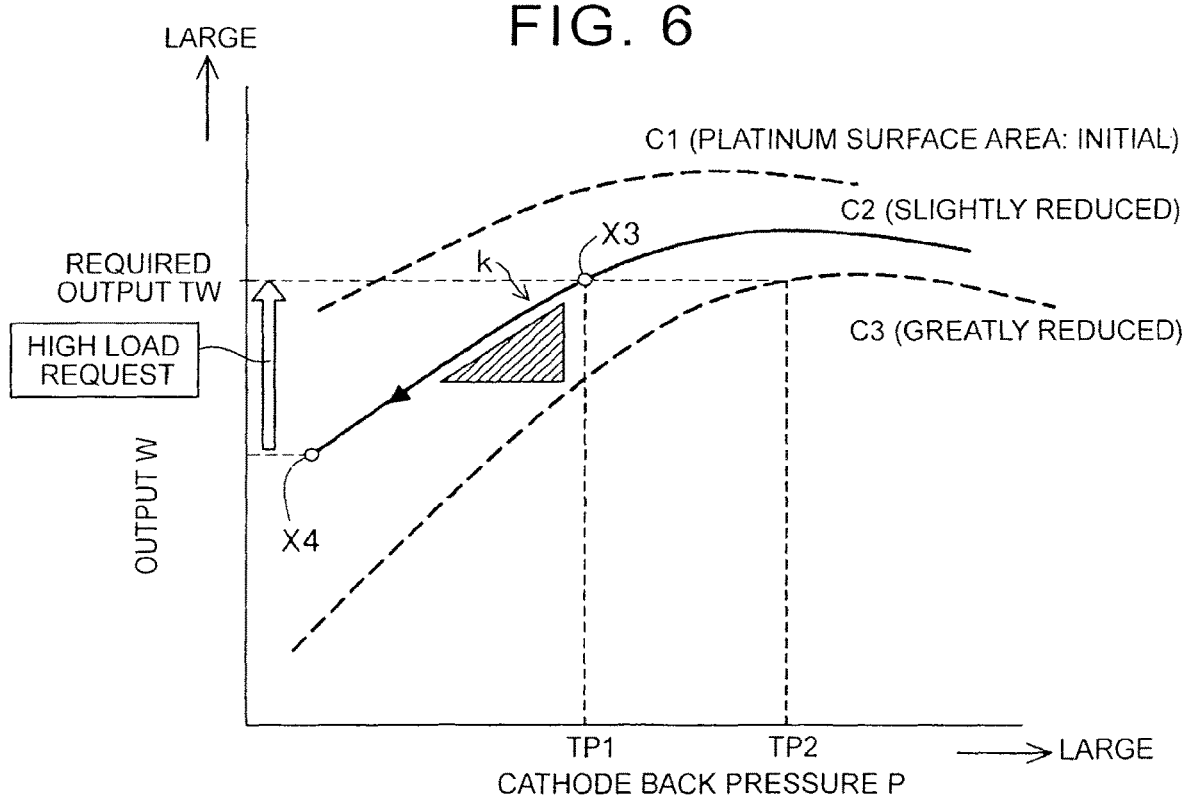
FIG. 6 is a graph showing a cathode back pressure—output characteristic curve according to a modified example of the second embodiment.

FIG. 6 is a graph showing the cathode back pressure—output characteristic curve according to the modified example of the second embodiment. In the fuel cell system according to the modified example, as shown in the drawing, when a low load request, i.e. a request to shift the load of the fuel cell 20 to a low load operating point X4, is received at a certain point X3, the cathode back pressure sensitivity S, i.e. the slope k of the curve, is determined at a low load shift timing at which the load of the fuel cell 20 starts to shift to the low load operating point X4. The cathode back pressure—output characteristic curve is then determined on the basis of the cathode back pressure sensitivity S. The cathode back pressure corresponding to the required output TW is then calculated as the target cathode back pressure TP using the cathode back pressure—output characteristic curve, whereupon the cathode back pressure P is controlled to the target cathode back pressure TP.

Hence, with the fuel cell system according to this modified example, similarly to the fuel cell systems according to the first embodiment and the second embodiment, the required output TW can be secured more reliably, and as a result, the power generation performance can be improved. Furthermore, similarly to the fuel cell system according to the second embodiment, the precision of the cathode back pressure—output characteristic curve increases, enabling a further improvement in the power generation performance.

Third Embodiment

A fuel cell system according to a third embodiment has an identical hardware configuration to the fuel cell system 10 according to the first embodiment, and differs therefrom only in the cathode back pressure control processing executed by the control unit 60. The cathode back pressure control processing according to the third embodiment is configured substantially identically to the cathode back pressure control processing according to the first embodiment, shown in FIG. 2, and differs therefrom only in the content of the processing executed in step S170. In other words, in the cathode back pressure control processing according to the third embodiment, the processing of steps S110 to S160 and S180 to S194 in FIG. 2 is executed as is, while the processing of step S170 alone is replaced with characteristic curve estimation processing to be described below. Note that since the hardware configuration of the third embodiment is identical to that of the first embodiment, identical reference symbols have been allocated to the respective constituent elements in the following description.

Figure 7:
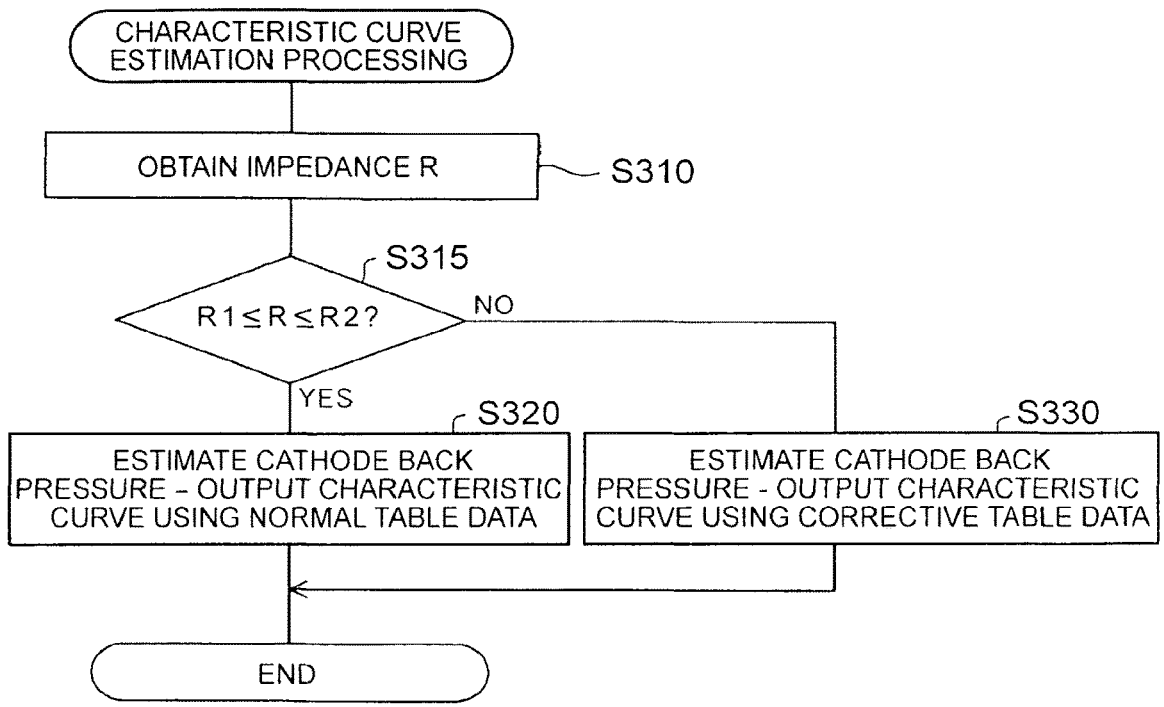
FIG. 7 is a flowchart showing characteristic curve estimation processing according to a third embodiment.

FIG. 7 is a flowchart showing the characteristic curve estimation processing according to the third embodiment. This characteristic curve estimation processing is executed by the control unit 60 during, the cathode back pressure control processing shown in FIG. 2 instead of the processing of step S170. As shown in FIG. 7, when the processing starts, first, the control unit 60 obtains an impedance R (step S310). The impedance R is obtained by dividing the voltage detected by the voltage sensor 2*b* by the current detected by the current sensor 2*a*.

Next, the control unit 60 determines whether or not the obtained impedance R is within a range extending from a first predetermined value R1 to a second predetermined value R2 (step S315). The first predetermined value R1 is a predetermined positive value, and the second predetermined value R2 is a predetermined positive value that is larger than the first predetermined value R1. The impedance R indicates a humidity condition in the interior of the fuel cell 20, and when the impedance R is within the range (to be referred to hereafter as an "appropriate range") extending from the first predetermined value R1 to the second predetermined value R2, this shows that the humidity condition of the fuel cell 20 is appropriate. Further, when the impedance R is lower than the first predetermined value R1, this shows that the fuel cell 20 is in a flooded condition, and when the impedance R is higher than the second predetermined value R2, this shows that the fuel cell 20 is in a dried up condition.

When the impedance R is determined to be in the appropriate range in step S315, the cathode back pressure—output characteristic curve is estimated using normal table data (step S320). The "normal table data" are identical to the table data used in step S170 of the first embodiment, and therefore an estimation result obtained in step S320 is identical to the result obtained in step S170 of the first embodiment.

When, on the other hand, the impedance R is determined to be outside the appropriate range in step S315, or in other words when the fuel cell 20 is determined to be flooded or dried up, the cathode back pressure—output characteristic curve is estimated using corrective table data (step S330).

Figure 8:
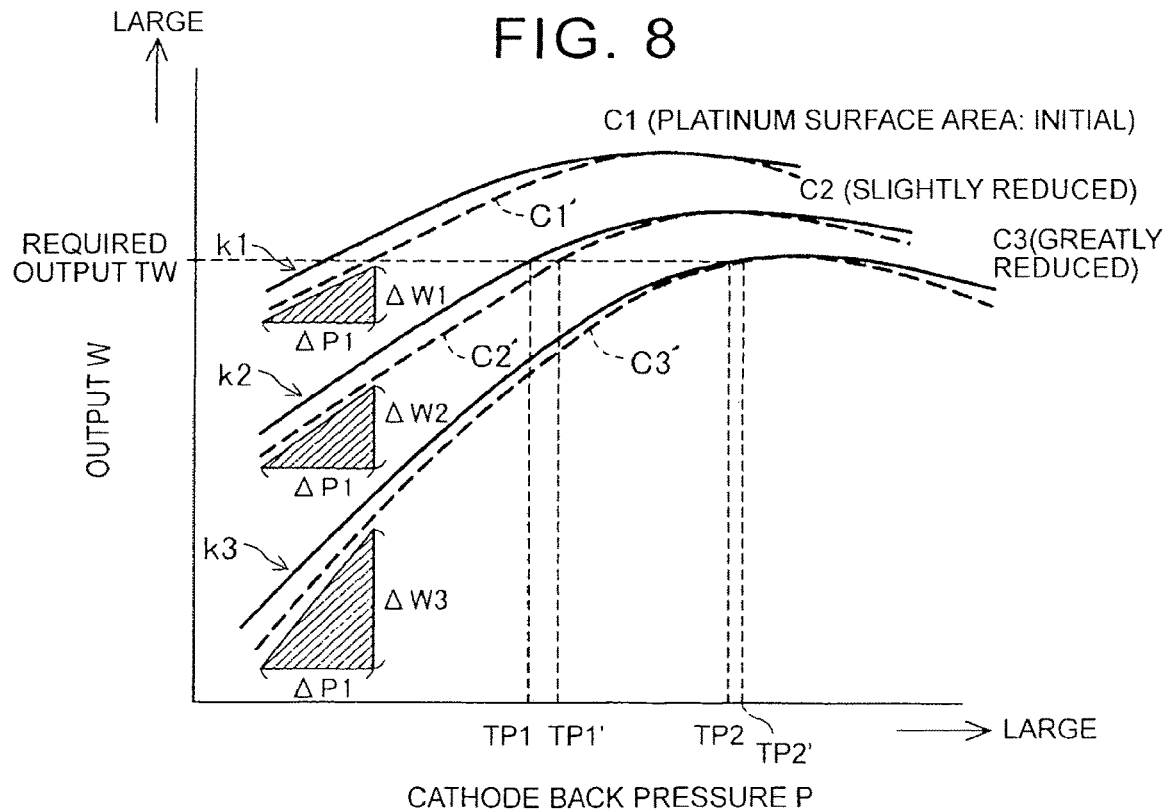
FIG. 8 is a graph showing a cathode back pressure—output characteristic curve according to the third embodiment.

The "normal table data" are used to extract the cathode back pressure—output characteristic curve shown in FIG. 3, whereas the "corrective table data" are used to extract a cathode back pressure—output characteristic curve shown in FIG. 8. The curves C1, C2, C3 shown in FIG. 8 are the cathode back pressure—output characteristic curves indicated by the normal table data. Curves C1', C2', C3' shown by dotted lines in FIG. 8, on the other hand, are cathode back pressure—output characteristic curves indicated by the corrective table data. The curves C1', C2', C3' have a slightly reduced output relative to the curves C1, C2, C3, and a difference between the output W on the cathode back pressure—output characteristic curves indicated by the normal table data and the output W on the cathode back pressure—output characteristic curves indicated by the corrective table data increases as the cathode back pressure P decreases. In other words, the curves C1', C2', C3' are corrected to indicate cases in which the platinum surface area has decreased in comparison with the curves C1, C2, C3. The curves C1', C2', C3' may be determined in advance by experiment or simulation.

Therefore, to obtain the required output TW in the drawing, a greater cathode back pressure P is required on all of the curves C1', C2', C3' in comparison with the curves C1, C2, C3. For example, TP1' is required instead of TP1, and TP2' is required instead of TP2. In other words, the corrective table data are data that have been corrected such that the magnitude of the cathode back pressure obtained at an identical required output is greater than that of the normal table data. A correction amount corresponds to the amount by which the platinum surface area of the fuel cell has decreased.

Returning to FIG. 7, following execution of step S320 or step S330, the characteristic curve estimation processing is temporarily terminated.

With the fuel cell system according to the third embodiment having the above configuration, similarly to the fuel cell system 10 according to the first embodiment, the required output TW can be secured more reliably, and as a result, the power generation performance can be improved. Furthermore, a following effect is obtained. The output of the fuel cell is more accurately commensurate with an effective platinum surface area. The "effective platinum surface area" is determined from a product of a platinum utilization rate, which varies according to an operating condition, and the platinum surface area, which decreases gradually as the use time increases. A condition of an oxide film and the flooding condition are factors determining the platinum utilization rate. When the fuel cell 20 is flooded, the platinum utilization rate is reduced by moisture, leading to a reduction in the output, but according to the third embodiment, the reduction in the output can be corrected by increasing the cathode back pressure correspondingly using the corrective table data, and therefore the required output TW can be secured more reliably. Further, when the fuel cell 20 is dried up, the cathode back pressure—output characteristic curve decreases similarly to that of the flooding condition, but likewise in this case, the reduction in the output can be corrected by increasing the cathode back pressure correspondingly using the corrective table data, and therefore the required output TW can be secured more reliably. As a result, the power generation performance can be improved even further.

Note that in the third embodiment, the humidity condition in the interior of the fuel cell 20 is determined on the basis of the impedance R, but instead, as a first modified example of the third embodiment, a dew point meter may be provided in the fuel cell such that the humidity condition is determined on the basis of a measurement result from the dew point meter. According to the first modified example, the humidity condition of the fuel cell can be determined with a higher degree of precision.

Further, in step S315 of the third embodiment, an AND determination is performed to determine that the impedance R is no lower than the first predetermined value R1 and no higher than the second predetermined value R2, but instead, as a second modified example of the third embodiment, a determination may be made only as to whether or not the impedance R is higher than the second predetermined value R2. With this configuration, the cathode back pressure—output characteristic curve can be estimated using the corrective table data when the fuel cell 20 is flooded. Furthermore, as a third modified example of the third embodiment, a determination may be made only as to whether or not the impedance R is lower than the first predetermined value R1. With this configuration, the cathode back pressure—output characteristic curve can be estimated using the corrective table data when the fuel cell 20 is dried up. Note that in the third embodiment, identical corrective table data are used in both the flooded condition and the dried up condition, but separate corrective table data having different differences to the cathode back pressure—output characteristic curves determined from the normal table data may be used instead.

Moreover, in the third embodiment, the determination as to whether the fuel cell 20 is flooded or dried up is made on the basis of the impedance R, but instead, as a fourth modified example of the third embodiment, the determination as to whether the fuel cell 20 is flooded or dried up may be made on the basis of the temperature of the fuel cell 20 detected by the temperature sensor 2c. Similar effects to the third embodiment are obtained with the fourth modified example.

Furthermore, in the third embodiment and the respective modified examples thereof, step S170 of the first embodiment is replaced with the processing shown in FIG. 7, but instead, as a fifth modified example of the third embodiment, step S170 (FIG. 4) of the second embodiment may be replaced with the processing shown in FIG. 7. According to the fifth modified example, similar effects to the second embodiment are obtained, and in addition, the required output TW can be secured more reliably even when the fuel cell 20 is flooded or dried up.

Fourth Embodiment

A fuel cell system according to a fourth embodiment differs from the fuel cell system 10 according to the third embodiment only in the characteristic curve estimation processing executed by the control unit, and is identical thereto in all other software and hardware configurations. Since the hardware configuration of the fourth embodiment is identical to that of the third embodiment, and therefore the first embodiment, identical reference symbols to those used in the first embodiment have been allocated to the respective constituent elements in the following description.

Figure 9:
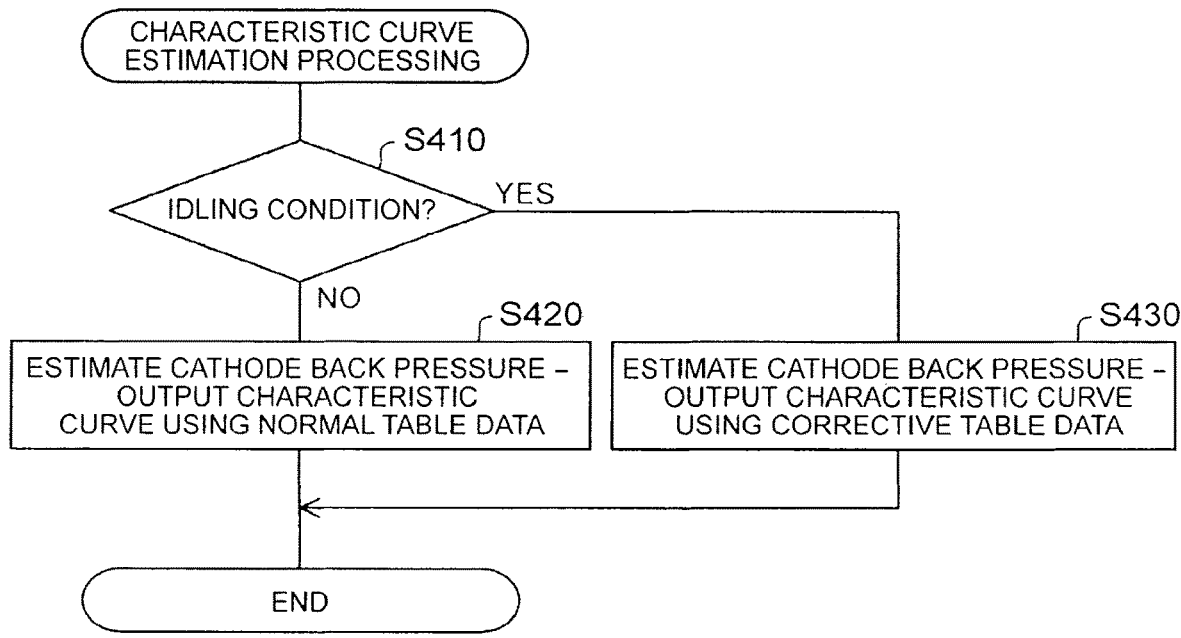
FIG. 9 is a flowchart showing characteristic curve estimation processing according to a fourth embodiment.

FIG. 9 is a flowchart showing the characteristic curve estimation processing according to the fourth embodiment. This characteristic curve estimation processing is executed by the control unit 60 during the cathode back pressure control processing shown in FIG. 2 instead of the processing of step S170. As shown in FIG. 9, when the processing starts, a determination is made as to whether or not the fuel cell 20 is in an idling condition (step S410). The idling condition is a condition in which the fuel cell 20 receives an idling load. A magnitude of the idling load approximates a load received in an open circuit (OC) condition. In this embodiment, the determination as to whether or not the fuel cell 20 is in the idling condition is made by determining whether or not the voltage detected by the voltage sensor 2b has been above a predetermined voltage continuously for at least a predetermined time. Here, when it is determined that the fuel cell 20 is not in the idling condition, the cathode back pressure—output characteristic curve is estimated using the normal table data (step S420). The processing of step S420 is identical to the processing of step S320 in FIG. 7, and the values of the normal table data are also identical.

When it is determined in step S410 that the fuel cell 20 is in the idling condition, on the other hand, the cathode back pressure—output characteristic curve is estimated using corrective table data (step S430). The processing of step S430 is substantially identical to the processing of step S330 in FIG. 7, and therefore, as shown in FIG. 8, the cathode back pressure—output characteristic curve is estimated using corrective table data indicating curves having a reduced output relative to the curves C1, C2, C3 of the normal table data. Curves C1', C2', C3' shown in FIG. 8 are cathode back pressure—output characteristic curves corresponding to the flooded condition or the dried up condition. Hence, the curves C1', C2', C3' of the corrective table data used in step S430 differ in shape from the curves C1', C2', C3' of the corrective table data used in step S330. More specifically, the corrective table data used in step S430 are aligned with the idling condition, and therefore take different values to the corrective table data used in step S320 of FIG. 7. As described above, however, the corrective table data indicate curves having a reduced output relative to the curves C1, C2, C3 of the normal table data.

With the fuel cell system according to the fourth embodiment having the above configuration, similarly to the fuel cell system 10 according to the first embodiment, the required output TW can be secured more reliably, and as a result, the power generation performance can be improved. Furthermore, a following effect is obtained. In the idling condition, power generation is performed continuously at a high voltage, and therefore an oxide film amount of the platinum increases and then settles at a fixed amount, leading to a reduction in the platinum utilization rate. In the fourth embodiment, a reduction in output caused by the reduction in the platinum utilization rate can be corrected by increasing the cathode back pressure using the corrective table data, and therefore the required output TW can be secured more reliably. As a result, the power generation performance can be improved even further.

Note that in the fourth embodiment, step S170 of the first embodiment is replaced with the processing of FIG. 9, but instead, as a first modified example of the fourth embodiment, step S170 (FIG. 4) of the second embodiment may be replaced with the processing shown in FIG. 9. According to the first modified example, similar effects to the second embodiment are obtained, and in addition, the required output can be secured more reliably even during an idling operation.

Figure 10:
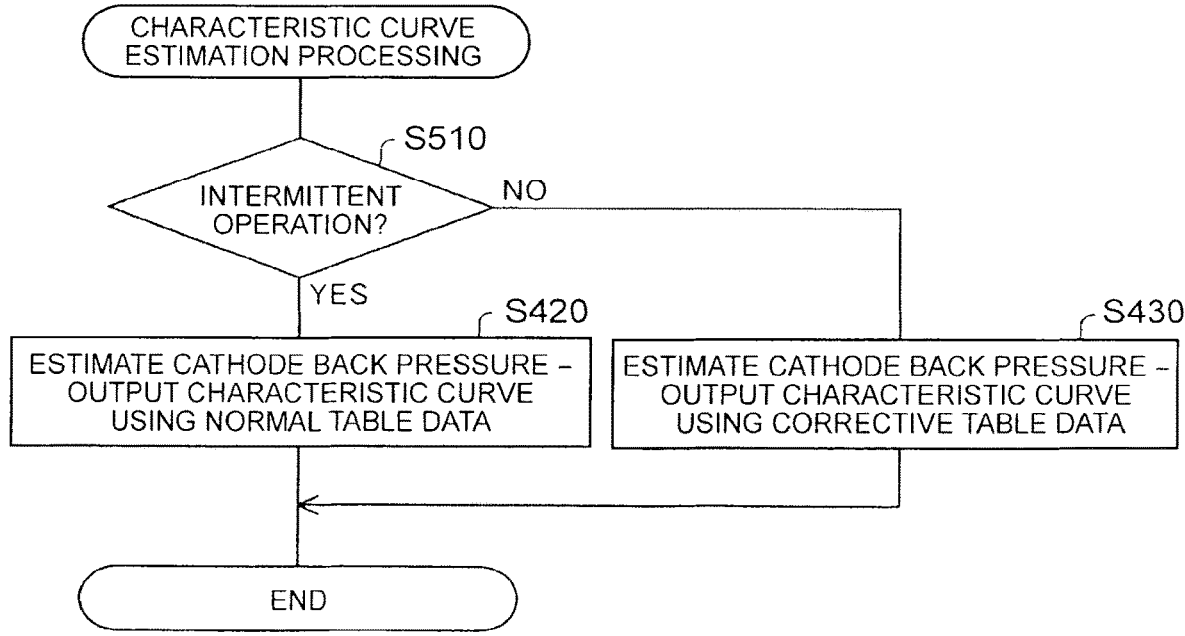
FIG. 10 is a flowchart showing characteristic curve estimation processing according to a second modified example of the fourth embodiment.

Further, as a second modified example of the fourth embodiment, the processing of step S410 in the first modified example of the fourth embodiment may be replaced with a configuration in which, as shown in FIG. 10, a determination is made as to whether or not the fuel cell 20 is in an intermittent operating condition (step S510). In an intermittent operating condition where a reaction gas (the oxidant gas and the fuel gas) supply to the fuel cell 20 is repeatedly started and stopped intermittently, a low voltage is maintained continuously. Accordingly, the oxide film amount of the platinum decreases and then settles at a fixed amount, whereby the platinum utilization rate increases to almost 100%. Hence, when the fuel cell 20 is determined to be in the intermittent operating condition in step S510, the cathode back pressure—output characteristic curve is estimated using the normal table data, similarly to step S420 of FIG. 9. When, on the other hand, the fuel cell 20 is determined not to be in the intermittent operating condition in step S510, the cathode back pressure—output characteristic curve is estimated using the corrective table data, similarly to step S430 of FIG. 9. In so doing, the required output TW can be secured more reliably.

Fifth Embodiment

In the fuel cell systems according to the first to fourth embodiments, the processing extending from detection of the cathode back pressure sensitivity S to estimation of the cathode back pressure—output characteristic curve is performed at a predetermined timing, whereupon the target cathode back pressure TP corresponding to the required output TW is calculated by referring to the cathode back pressure—output characteristic curve. In an alternative configuration, the estimated cathode back pressure—output characteristic curve may be used continuously for a predetermined period such as one day or one week. This configuration is employed in a fuel cell system according to a fifth embodiment. In a case where the fifth embodiment is applied to the first embodiment, for example, when the cathode back pressure—output characteristic curve is first obtained in step S170 of FIG. 2, the estimated cathode back pressure—output characteristic curve is stored in a non-volatile memory, for example an erasable programmable read only memory (EPROM) included in the control unit 60, that maintains its storage content even after a power supply of the fuel cell system has been switched OFF, and for the predetermined period, only steps S180 to S192 of FIG. 2 are executed during the cathode back pressure control processing. In other words, the target cathode back pressure TP is calculated using the cathode back pressure—output characteristic curve stored in the EPROM in step S190. After the predetermined period has elapsed, the cathode back pressure—output characteristic curve is updated by executing steps S110 to S194 of FIG. 2, whereupon the updated cathode back pressure—output characteristic curve is used throughout the next predetermined period.

As described above, the cathode back pressure—output characteristic curve determined on the basis of the cathode back pressure sensitivity S corresponds to the platinum surface area, and therefore typically does not vary greatly over the course of a few days. Hence, the target cathode back pressure TP can be calculated with a high degree of precision likewise with the fuel cell system according to the fifth embodiment. Moreover, the cathode back pressure—output characteristic curve need only be calculated once per predetermined period, enabling an improvement in the responsiveness of the processing. Note that the configuration of the fifth embodiment may be applied likewise to any of the second to fourth embodiments as well as the first embodiment.

Sixth Embodiment

Next, a sixth embodiment will be described. The sixth embodiment has an identical hardware configuration to the first embodiment, and therefore, in the following description, identical reference symbols to those of the first embodiment have been allocated to the respective constituent elements. In the first embodiment, the cathode back pressure—output characteristic curve is estimated by preparing a plurality of cathode back pressure—output characteristic curves in the table data in advance and then selecting one cathode back pressure—output characteristic curve on the basis of the cathode back pressure sensitivity S. In the sixth embodiment, on the other hand, the cathode back pressure—output characteristic curve is estimated using a formula for determining the current density. First, the current density generated by the fuel cell 20 will be considered. The current density can be determined from a following Equation (1).

$$i = A_{Pt} i_O (1-\theta)(P_{O2}/P_{ref}) \exp(-\alpha F\eta/RT) \quad (1)$$

where "i" is the current density, "$A_{Pt}$" is the cathode platinum surface area, "$i_O$" is a cathode alternating current density, "$\theta$" is an oxide film ratio, "$P_{O2}$" is a required oxygen partial pressure, "$P_{ref}$" is a reference oxygen concentration, "$\alpha$" is a charge transfer coefficient, "F" is a Faraday's constant, "$\eta$" is a cathode overvoltage, "R" is a gas constant, and "T" is the fuel cell temperature.

In Equation (1), a value of the cathode platinum surface area $A_{Pt}$ can be obtained by estimation from the cathode back pressure sensitivity S determined in the first embodiment. As described in the first embodiment, the cathode back pressure—output characteristic curve varies in shape according to the platinum surface area, and the shape thereof is estimated from the cathode back pressure sensitivity S. Estimating the cathode back pressure—output characteristic curve is therefore equivalent to estimating the cathode platinum surface area. A value of the cathode alternating current density $i_O$ is a fixed value determined at a design stage of the fuel cell.

The oxide film ratio θ is an unknown value. The value (1−θ) indicates the platinum utilization rate. As noted above, strictly speaking, the platinum utilization rate is determined from the oxide film condition and the flooding condition, but in the sixth embodiment, the value (1−θ) indicates the platinum utilization rate assuming flooding has not occurred. Hence, when the platinum utilization rate (1−θ) is not already known, refresh processing is executed to eliminate the oxide film (oxide film ratio θ=0) and thereby set the platinum utilization rate (1−θ) at a known value.

A value of the required oxygen partial pressure $P_{O2}$ can be obtained by multiplying the cathode back pressure P detected by the pressure sensor 3b by a predetermined oxygen ratio (0.21, for example). A value of the reference oxygen concentration $P_{ref}$ is an oxygen concentration in a reference condition, and 100 (kpa-abs) is used conventionally. Note that "kpa-abs" is a unit expressing absolute pressure. The charge transfer coefficient α, the Faraday's constant F, and the gas constant T respectively take fixed values. A value of the cathode overvoltage η is obtained by subtracting an actual voltage from an open circuit voltage (OCV). The "actual voltage" is a voltage of a single cell, which is obtained by the voltage sensor 2b. The fuel cell temperature T is obtained by the temperature sensor 2c.

Figure 11:
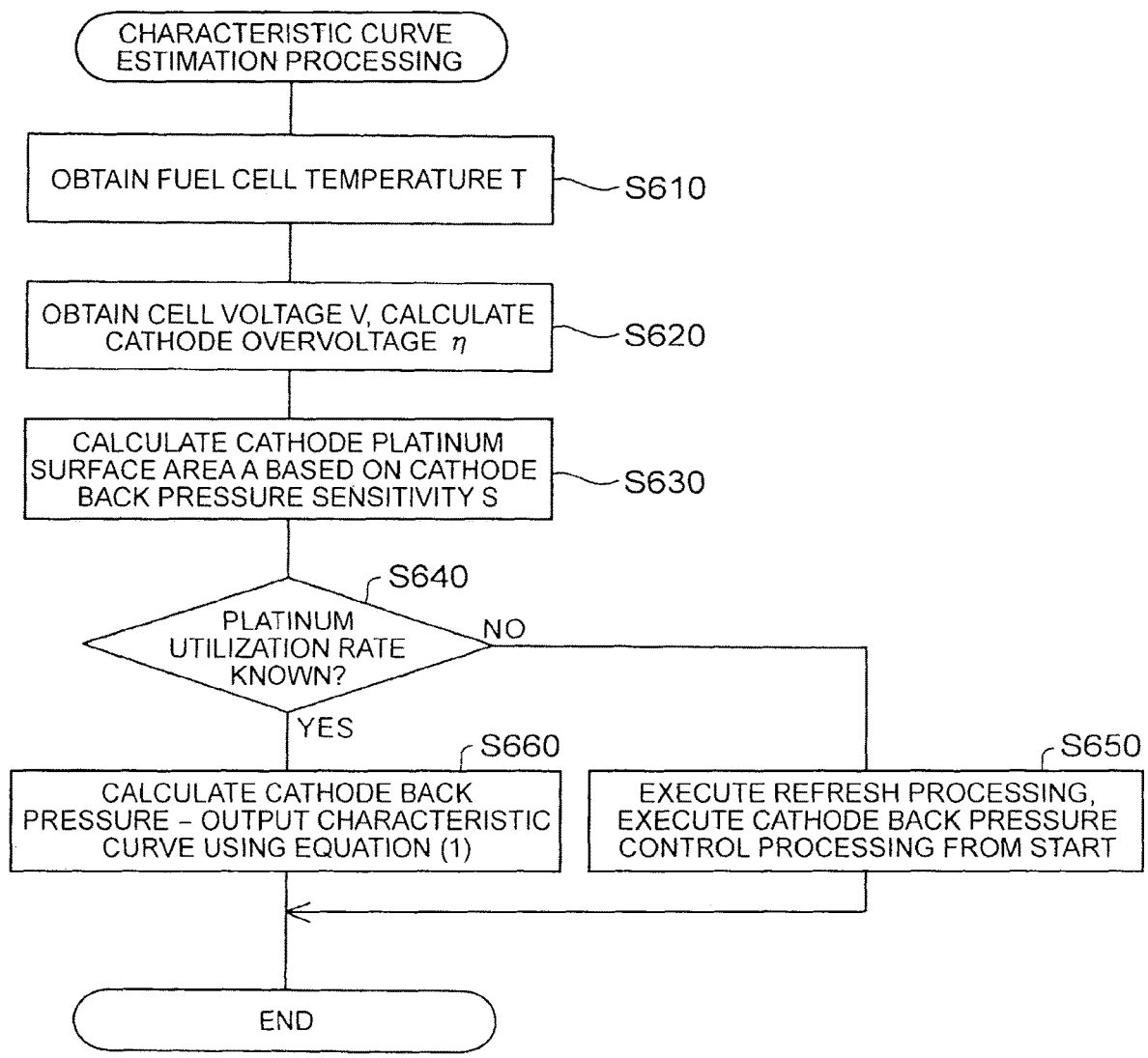
FIG. 11 is a flowchart showing characteristic curve estimation processing according to a sixth embodiment.

FIG. 11 is a flowchart showing characteristic curve estimation processing according to the sixth embodiment. In the sixth embodiment, substantially identical processing to the cathode back pressure control processing of the first embodiment, shown in FIG. 2, is executed, but the processing of step S170 in FIG. 2 is replaced with this characteristic curve estimation processing. In other words, the cathode back pressure control processing according to the sixth embodiment is identical to the cathode back pressure control processing according to the first embodiment except for step S170.

As shown in FIG. 11, when the processing starts, first, the control unit 60 obtains the fuel cell temperature T from the temperature sensor 2c (step S610). Next, the control unit 60 obtains a cell voltage V from the voltage sensor 2b, and determines the cathode overvoltage η by subtracting the cell voltage V from the OCV (step S620). Next, the control unit 60 determines the cathode platinum surface area $A_{Pt}$ on the basis of the cathode back pressure sensitivity S determined in step S160 of FIG. 2 (step S630). As described above, the cathode platinum surface area $A_{Pt}$ can be calculated from the cathode back pressure sensitivity S.

Next, the control unit 60 determines whether or not the platinum utilization rate is known (step S640). As described above, after power is generated at a low voltage (a high voltage) following an idling (OC avoidance) operation, the oxide film amount of the platinum settles at a fixed amount (on a large side), and therefore the value of θ is substantially zero, in which case the platinum utilization rate is known. Further, after power is generated in a certain fixed voltage range (a low voltage) following, for example, an intermittent operation (a natural voltage drop), the platinum film amount settles at a fixed amount (on a small side), and therefore θ takes a value of 0.5, for example, in which case the platinum utilization rate is, known. Hence, the determination of step S640 as to whether or not the platinum utilization rate is known is made by determining whether or not power has been generated at a low voltage (a high voltage) or whether or not power has been generated in a fixed voltage range (a low voltage).

When it is determined in step S640 that the platinum utilization rate is not known, the control unit 60 advances the processing to step S650, in which refresh processing is executed, and then executes the cathode back pressure control of FIG. 2 from the beginning. The refresh processing is executed to remove the platinum oxide film of the cathode catalyst layer. More specifically, the cell voltage of the fuel cell 20 is reduced to a threshold set in advance as a recovery target voltage by the DC/DC converter 51. A converter command voltage is then maintained at the threshold such that the oxidant gas is blown, causing an oxygen utilization rate to reach or exceed 100%, and as a result, the voltage reduction generated by the DC/DC converter 51 is eliminated. In so doing, the cell voltage of the fuel cell 20 is reduced to a reduced zone, whereby the oxide film on the surface of the Pt catalyst is reduced and removed. Note that the oxidant gas is blown by fully opening the back pressure regulating valve A1 and maximizing the rotation speed of the motor M1 of the air compressor 31.

When, on the other hand, it is determined in step S640 that the platinum utilization rate is known, the control unit 60 estimates the cathode back pressure—output characteristic curve using Equation (1) (step S660). As described above, variables in Equation (1) are the cathode platinum surface area $A_{Pt}$, the oxide film ratio θ, the required oxygen partial pressure $P_{O2}$, the cathode overvoltage η, and the fuel cell temperature T, and these variables, excluding the required oxygen partial pressure $P_{O2}$, are determined in steps S610 to S650. Hence, the control unit 60 determines a correspondence relationship between the required oxygen partial pressure $P_{O2}$ and the current density i by inserting the respective variables determined in steps S610 to S650 into Equation (1). The cathode back pressure—output characteristic curve is then determined from the correspondence relationship by converting the required oxygen partial pressure $P_{O2}$ into the cathode back pressure P and converting the current density i into the output W. After step S660 is executed, the characteristic curve estimation processing is temporarily terminated.

Hence, with the fuel cell system according to the sixth embodiment, similarly to the fuel cell system 10 according to the first embodiment, the required output TW can be secured more reliably, and as a result, the power generation performance can be improved. Moreover, with the fuel cell system according to the sixth embodiment, the cathode back pressure—output characteristic curve is determined using a formula, and therefore table data mapping a plurality of cathode back pressure—output characteristic curves do not have to be prepared in the memory in advance. As a result, memory resources can be saved.

Note that in the sixth embodiment, step S170 of the first embodiment is replaced with the processing of FIG. 11, but instead, as a modified example of the sixth embodiment, step S170. (FIG. 4) of the second embodiment may be replaced with the processing shown in FIG. 11. According to this modified example, similar effects to the second embodiment are obtained, and in addition, memory resources can be saved.

Seventh Embodiment

A fuel cell system according to a seventh embodiment has an identical hardware configuration to the fuel cell system 10 according to the sixth embodiment, and the cathode back pressure control processing (FIG. 2, FIG. 11) executed by the control unit is also identical. The fuel cell system according to the seventh embodiment differs from the fuel cell system 10 according to the sixth embodiment in further including humidity control processing as software. Note that since the hardware configuration of the seventh embodiment is identical to that of the first embodiment, identical reference symbols to those of the first embodiment have been allocated to the respective constituent elements in the following description.

Figure 12:
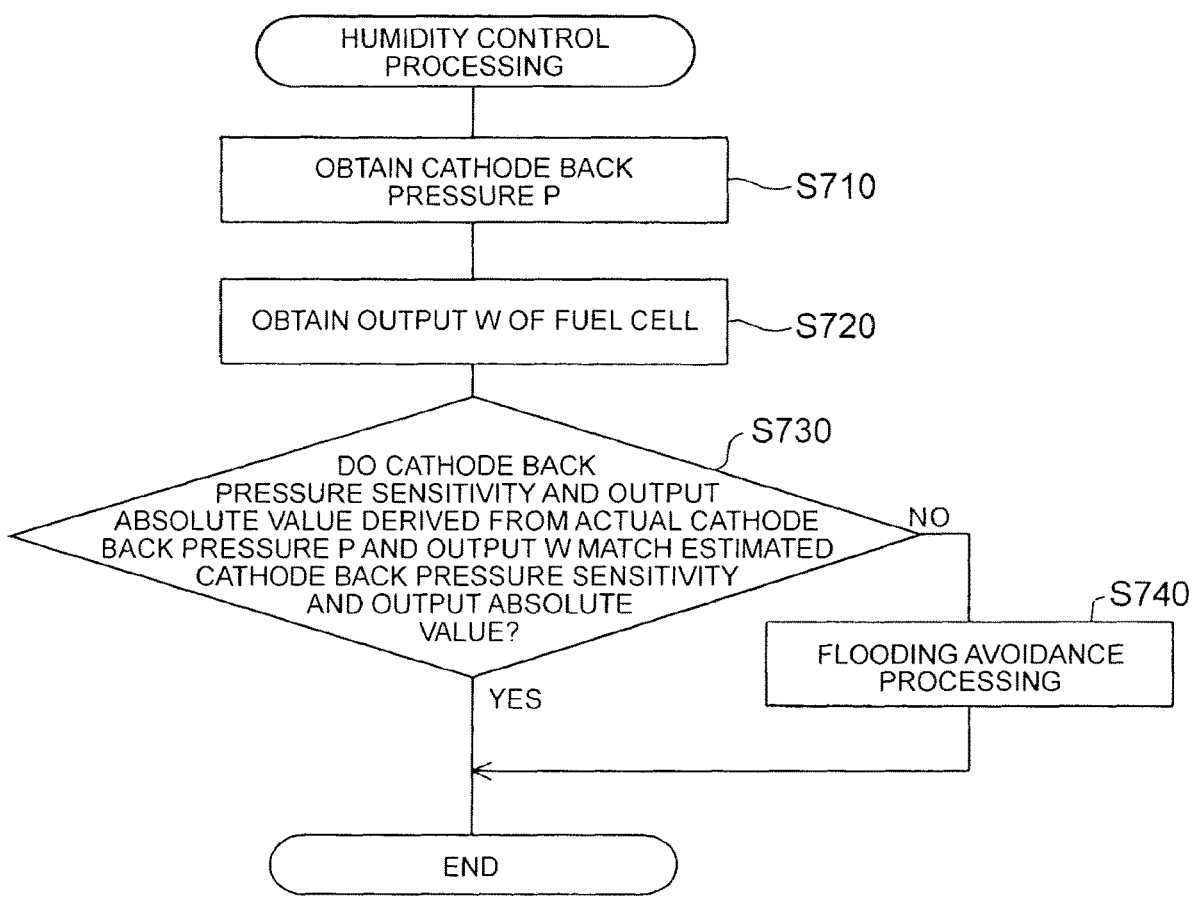
FIG. 12 is a flowchart showing humidity control processing according to a seventh embodiment.

FIG. 12 is a flowchart showing the humidity control processing according to the seventh embodiment. The humidity control processing is started after executing the processing for controlling the cathode back pressure P to the target cathode back pressure. TP in step S192 of the cathode back pressure control processing (FIG. 2, FIG. 11). When the processing starts, first, the control unit 60 performs processing to obtain the cathode back pressure P from the pressure sensor 3*b* (step S710). Next, the control unit 60 obtains the actual output W of the fuel cell 20 (step S720). More specifically, the control unit 60 determines the output power as the output W by obtaining the current and the voltage from the current sensor 2*a* and the voltage sensor 2*b*, respectively, and then multiplying the current by the voltage.

Next, the control unit 60 compares an actual cathode back pressure sensitivity with an estimated cathode back pressure sensitivity S and compares an actual output absolute value with an estimated output absolute value in order to determine whether or not the actual cathode back pressure sensitivity matches the estimated cathode back pressure sensitivity and the actual output absolute value matches the estimated output absolute value (step S730). The actual cathode back pressure sensitivity and the actual output absolute value are derived from the actual cathode back pressure P obtained in step S710 and the actual output W obtained in step S720. The estimated cathode back pressure sensitivity S and the estimated output absolute value are determined from the cathode back pressure—output characteristic curve estimated in the cathode back pressure control processing of FIG. 2 (more specifically, determined in step S760 of FIG. 11). Here, "matches" includes not only a case in which the values are completely identical, but also a case in which the values differ within an allowable range. As described above, the cathode back pressure sensitivity is the slope at a predetermined timing (for example, the timing for starting to increase the cathode back pressure) on the characteristic curve indicating variation in the output W of the fuel cell relative to the cathode back pressure P. The output absolute value is an absolute value of the output W on the characteristic curve at the predetermined timing.

When it is determined in step S730 that the actual cathode back pressure sensitivity matches the estimated cathode back pressure sensitivity and the actual output absolute value matches the estimated output absolute value, the cathode back pressure control processing is temporarily terminated. When, on the other hand, it is determined in step S730 that the actual cathode back pressure sensitivity does not match the estimated cathode back pressure sensitivity and/or the actual output absolute value does not match the estimated output absolute value, it is determined that flooding has occurred in the fuel cell 20, and therefore flooding avoidance processing is performed (step S740).

As described above, the platinum utilization rate is determined by the oxide film condition and the flooding condition, and in the sixth embodiment, the cathode back pressure control processing is performed assuming that flooding has not occurred. In the seventh embodiment, on the other hand, instead of assuming that flooding has not occurred, flooding is determined to have occurred when the actual cathode back pressure sensitivity and the actual output absolute value derived from the actual cathode back pressure P and the actual output W deviate from the estimated cathode back pressure sensitivity S and the estimated output absolute value determined from the cathode back pressure—output characteristic curve estimated in the cathode back pressure control processing, and in this case, the flooding avoidance processing is performed. In other words, the flooding avoidance processing is performed when it is determined in step S730 that the actual cathode back pressure sensitivity does not match the estimated cathode back pressure sensitivity and/or the actual output absolute value does not match the estimated output absolute value.

The flooding avoidance processing of step S740 is performed to reduce a humidification amount applied by the humidification module 33 below normal conditions. Note that the flooding avoidance processing is not necessarily limited to this configuration, and may be performed by another method such as increasing the internal temperature of the fuel cell 20, for example. More specifically, in a case where a coolant flow passage carrying a coolant that flows through the interior of the fuel cell passes through a radiator provided alongside a cooling fan, the internal temperature is increased by stopping the cooling fan.

As described heretofore, the output of the fuel cell is commensurate with the effective platinum surface area, and the effective platinum surface area is determined by the platinum utilization rate and the platinum surface area. Hence, a manner in which the cathode back pressure—output characteristic curve varies depending on whether or not flooding has occurred when respective magnitudes of the platinum utilization rate and the platinum surface area vary will be described below.

FIG. 13 is an illustrative view showing variation in the cathode back pressure—output characteristic curve depending on the presence or absence of flooding under respective conditions. The conditions are respective combinations of high and low platinum utilization rates and large and small effective platinum surface areas.

Figure 13A:
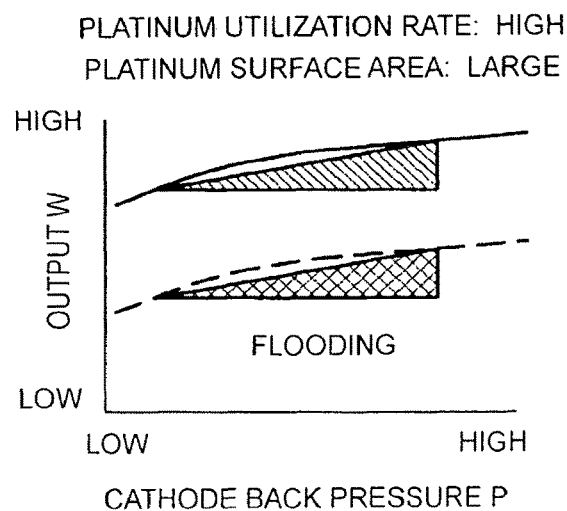
FIGS. 13A to 13D are illustrative views showing variation in the cathode back pressure—output characteristic curve depending on the presence or absence of flooding under respective conditions.
Figure 13B:
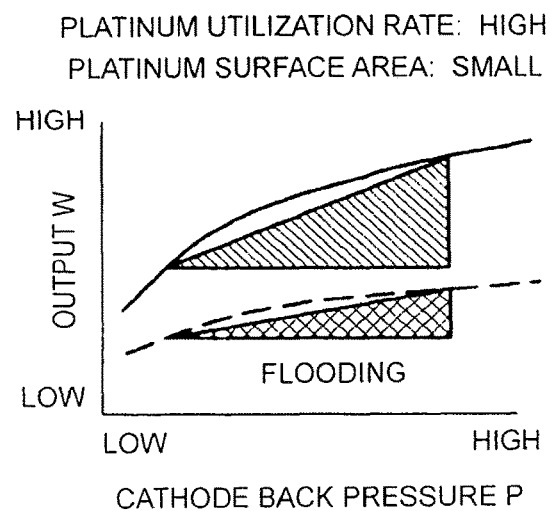
Figure 13C:
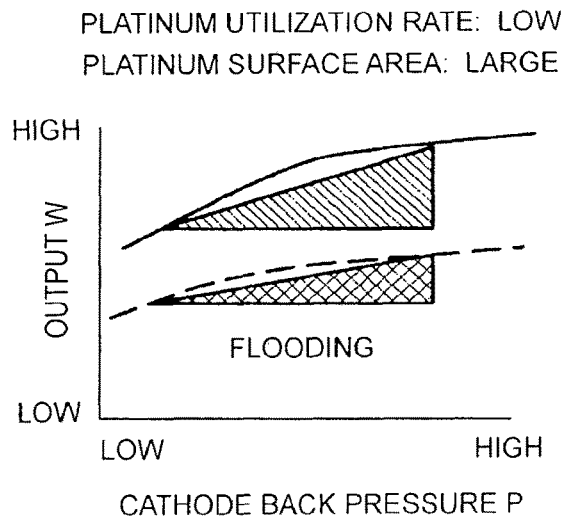
Figure 13D:
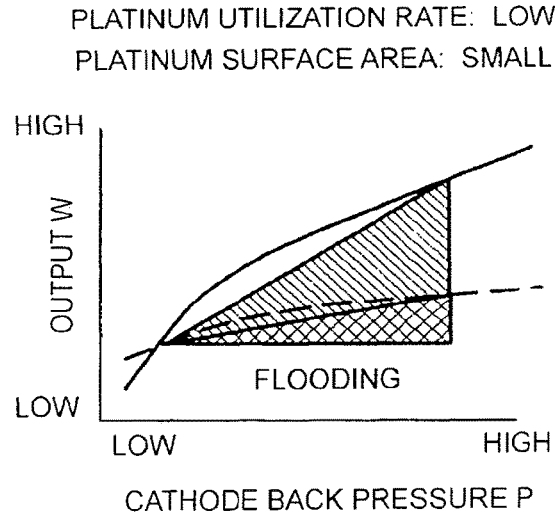

When the platinum utilization rate is high and the effective platinum surface area is large, as shown in FIG. 13A, the cathode back pressure sensitivity (the slope) does not vary regardless of whether flooding is present (dotted line) or absent (solid line), whereas the output absolute value is smaller when flooding is present than when flooding is absent. When the platinum utilization rate is high and the effective platinum surface area is small, as shown in FIG. 13B, the cathode back pressure sensitivity (the slope) and the output absolute value are both smaller when flooding is present than when flooding is absent. When the platinum utilization rate is low and the effective platinum surface area is large, as shown in FIG. 13C, the cathode back pressure sensitivity (the slope) and the output absolute value are both smaller when flooding is present than when flooding is absent. When the platinum utilization rate is low and the effective platinum surface area is small, as shown in FIG. 13D, the output absolute value does not vary greatly regardless of whether flooding is present (dotted line) or absent (solid line), whereas the cathode back pressure sensitivity (the slope) is smaller when flooding is present than when flooding is absent.

It is therefore evident that by comparing the respective values of the cathode back pressure sensitivity (the slope) and the output absolute value when flooding is absent with the values thereof when flooding is present, the presence of flooding can be determined on the basis of at least one of the comparison results even when the respective magnitudes of the platinum utilization rate and the platinum surface area vary.

With the fuel cell system according to the seventh embodiment having the above configuration, similarly to the fuel cell system according to the sixth embodiment, the required output TW can be secured more reliably, and as a result, the power generation performance can be improved. Furthermore, with the fuel cell system according to the seventh embodiment, a case in which flooding has occurred can be handled by avoiding the flooding, enabling a further improvement in the power generation performance.

Note that in the seventh embodiment, similarly to the sixth embodiment, step S170 of the first embodiment is replaced with the processing of FIG. 11, but instead, as a modified example of the seventh embodiment, step S70 (FIG. 4) of the second embodiment may be replaced with the processing shown in FIG. 11. According to this modified example, similar effects to the second embodiment are obtained, and in addition, memory resources can be saved, and a further improvement in the power generation performance can be achieved by avoiding flooding.

Further, in the seventh embodiment, the cathode back pressure—output characteristic curve is determined using a formula, but similarly to the first embodiment, a configuration in which table data mapping a plurality of cathode back pressure—output characteristic curves are prepared in advance in the memory and a desired cathode back pressure—output characteristic curve is selected therefrom on the basis of the cathode back pressure sensitivity S, or in other words the original configuration of step S170 in FIG. 2, may be employed instead. Likewise with this configuration, flooding can be avoided, enabling a further improvement in the power generation performance.

Eighth Embodiment

A fuel cell system according to an eighth embodiment has an identical hardware configuration to the fuel cell system 10 according to the first embodiment. Note that in the following description, identical reference symbols to those of the first embodiment have been allocated to the respective constituent elements of the hardware. In the eighth embodiment, the output of the fuel cell is secured at the same time as a condition of the battery 52 is improved through a single control process. This total control is executed by the control unit 60.

Figure 14:
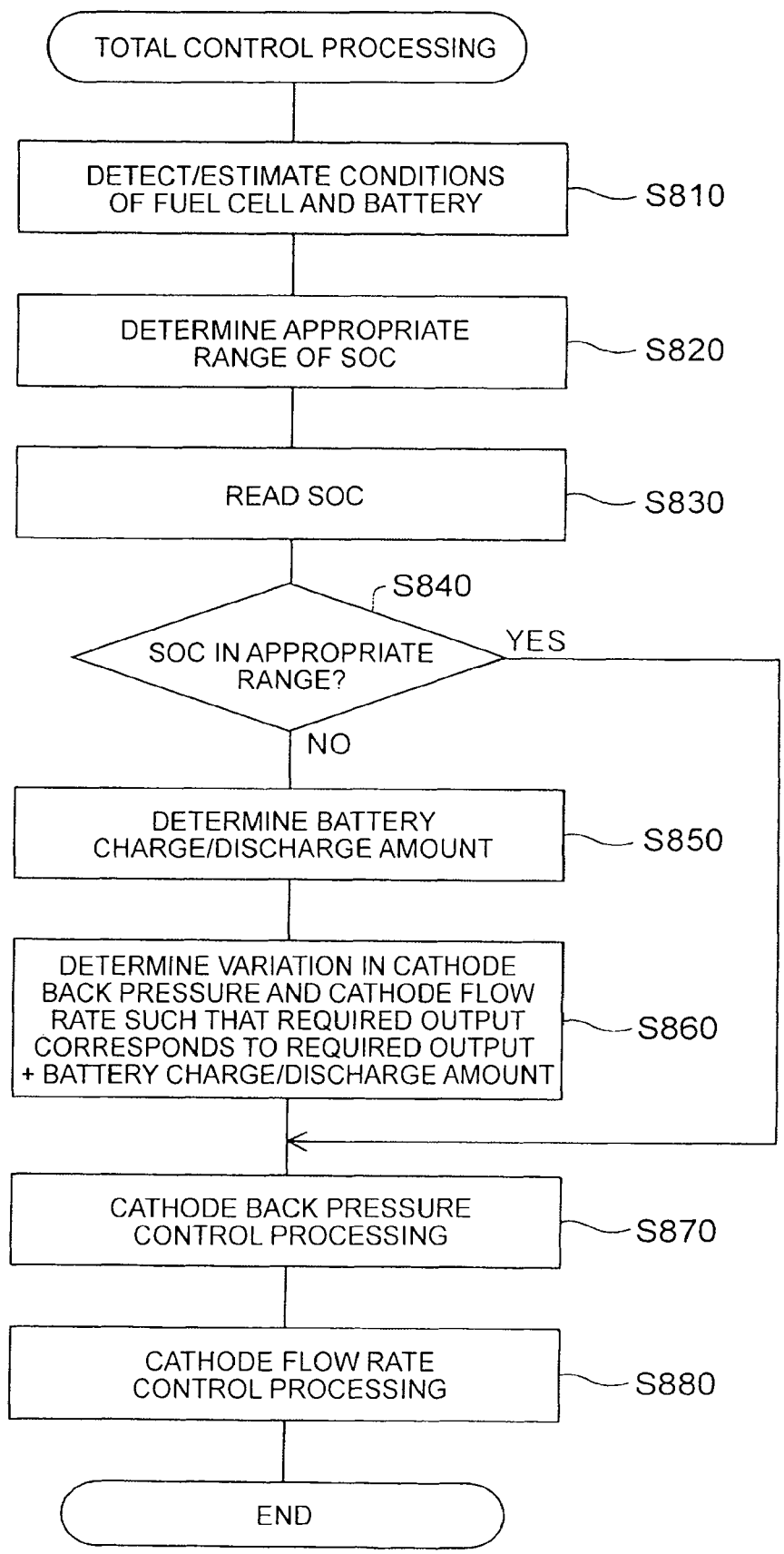
FIG. 14 is a flowchart showing total control processing according to an eighth embodiment.

FIG. 14 is a flowchart showing total control processing according to the eighth embodiment. The total control processing is executed repeatedly by the control unit 60 at predetermined time intervals. As shown in the drawing, when the processing starts, the control unit 60 performs processing to detect and estimate respective conditions of the fuel cell 20 and the battery 52 (step S810). For example, the control unit 60 detects the condition of the fuel cell 20 by estimating an amount of moisture in the fuel cell 20 from the impedance value thereof and determining from the moisture amount whether the fuel cell 20 is dried up or flooded. Further, for example, the control unit 60 detects the condition of the battery 52 by determining a deterioration condition of the battery 52 from a voltage measurement obtained during startup.

Next, the control unit 60 determines an appropriate range of the SOC of the battery on the basis of the conditions of the fuel cell 20 and the battery 52 estimated in step S810 (step S820). The "SOC" is an index indicating an amount of power remaining in the battery, and is defined here as a value obtained by dividing an amount of electricity remaining in the battery 52 by an amount of electricity stored in the battery when the battery is fully charged. Note that the SOC of the battery may be defined as a chargeable amount instead of a remaining capacity. The "appropriate range" is a range in which the battery 52 can be used efficiently. The appropriate range varies according to the condition of the fuel cell 20 as well as the condition of the battery 52. The appropriate range is set steadily higher as an internal condition of the fuel cell 20 deteriorates.

Next, the control unit 60 performs processing to read the SOC of the battery 52 (step S830). More specifically, the SOC is calculated on the basis of a charge/discharge current of the battery 52, which is detected by a battery current sensor (not shown). Next, the control unit 60 determines whether or not the SOC obtained in step S830 is within the appropriate range obtained in step S820 (step S840). When it is determined in step S840 that the SOC is not in the appropriate range, a charge/discharge amount required to shift the SOC of the battery 52 into the appropriate range is determined (step S850).

After executing step S850, the control unit 60 determines variation (variation amounts) in the cathode back pressure and a cathode flow rate needed for the required output TW required of the fuel cell 20 to reach a magnitude raised (increased) by the battery charge/discharge amount determined in step S850 (step S860). The "cathode flow rate" is a flow rate of the oxidant gas supplied to the fuel cell 20.

Figure 15:
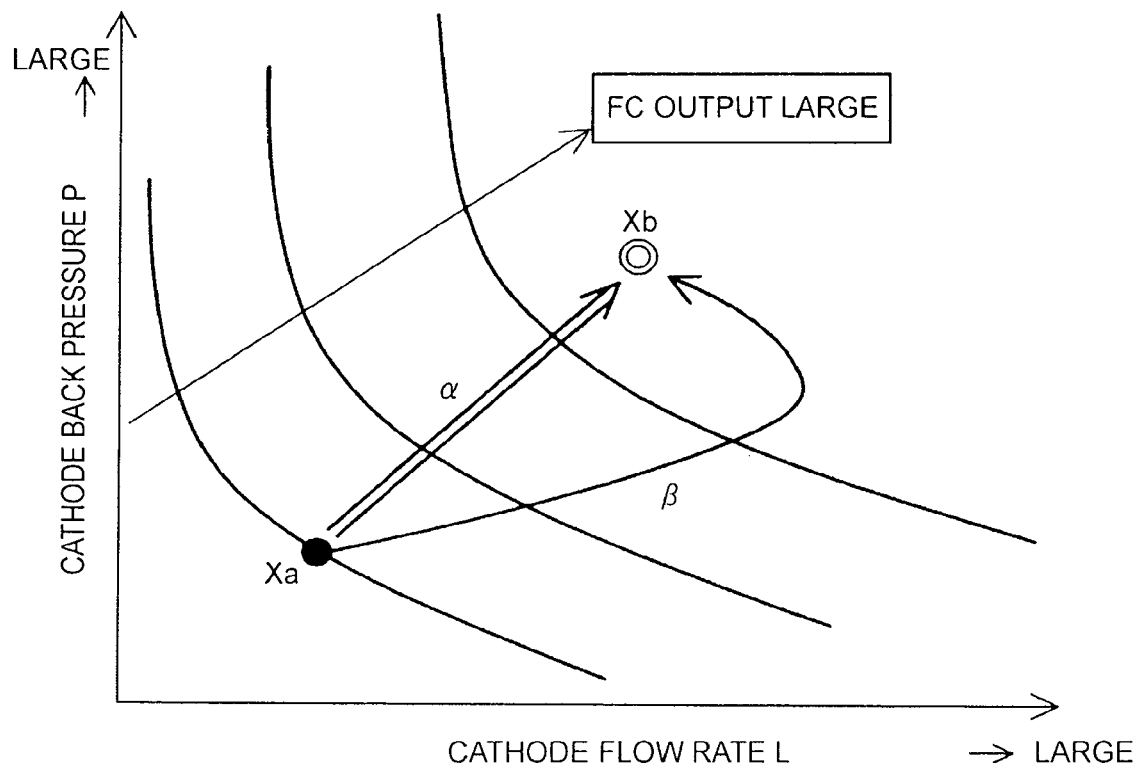
FIG. 15 is a graph showing a correspondence relationship between the cathode back pressure and a cathode flow rate during execution of the cathode back pressure control processing.

FIG. 15 is a graph showing a correspondence relationship between the cathode back pressure P and a cathode flow rate L during execution of the cathode back pressure control processing. When the accelerator pedal 80 is depressed such that an operating condition shifts from a point Xa to a point Xb, with the cathode back pressure control processing according to the first embodiment, the operating condition is shifted along a path indicated by an arrow α in the drawing. According to the eighth embodiment, on the other hand, the operating condition is shifted along a path indicated by an arrow β in the drawing. In other words, as shown by the arrow β, a ratio of an increase in the cathode flow rate L to an increase in the cathode back pressure P is controlled to be greater than that of the first embodiment indicated by the arrow α.

Figure 16:
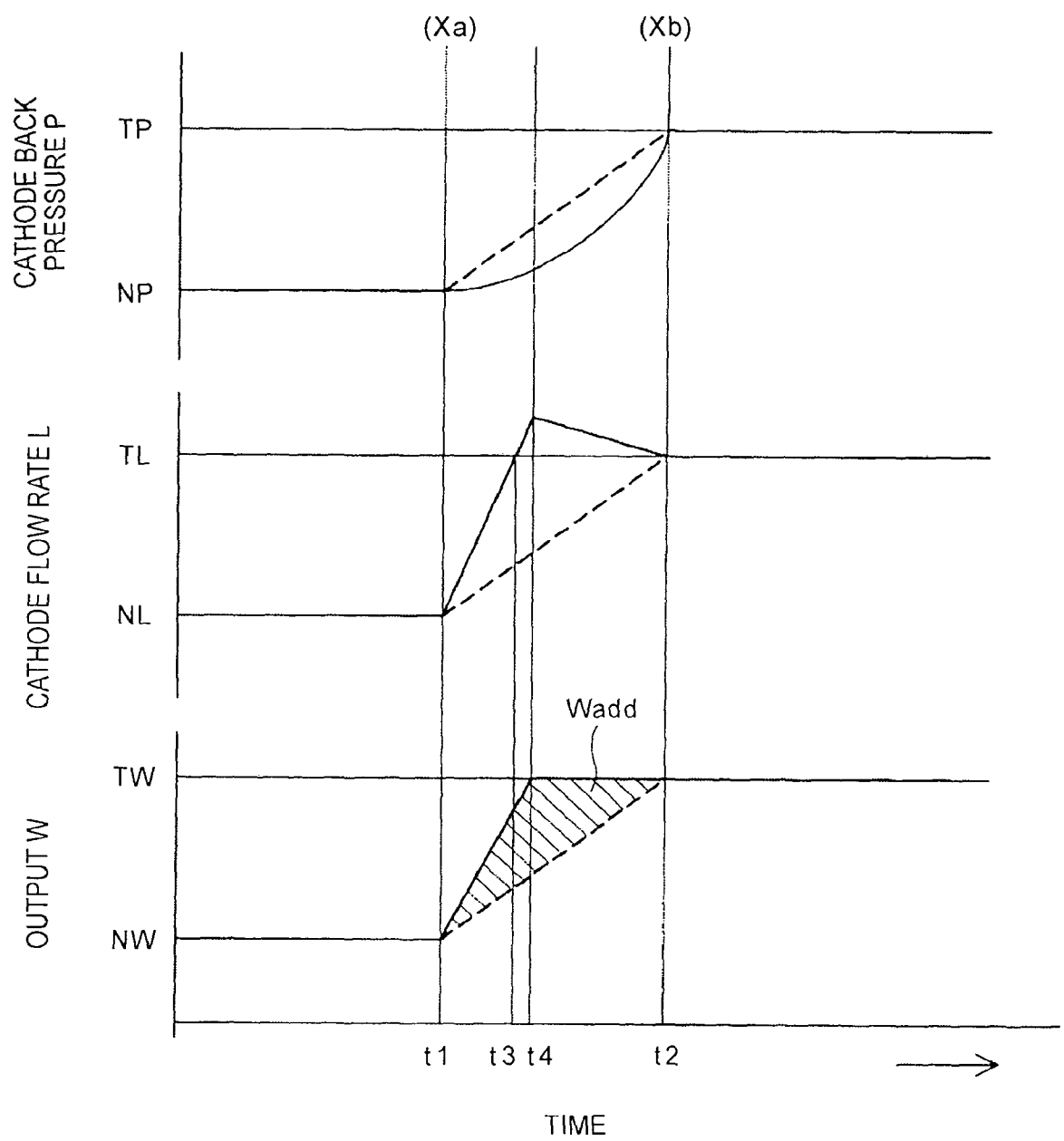
FIG. 16 is a timing chart showing variation in the cathode back pressure, the cathode flow rate, and an output of a fuel cell.

FIG. 16 is a timing chart showing variation in the cathode back pressure P, the cathode flow rate L, and the output W of the fuel cell 20. It is assumed that the accelerator pedal 80 is depressed at a time t1 such that the output W of the fuel cell 20 reaches the required output TW at a time t2. A timing of the time t1 corresponds to the point Xa in FIG. 15, and a timing of the time t2 corresponds to the point Xb in FIG. 15. Dotted lines in the drawing denote variation according to the first embodiment, while solid lines in the drawing denote variation according to the eighth embodiment.

As shown in the drawing, in a transition period from the time t1 to the time t2, the cathode back pressure P according to the first embodiment varies so as to increase temporarily over time, whereas the cathode back pressure P according to the eighth embodiment varies so as to increase at a delay relative to the first embodiment. Note, however, that the time t2 at which the cathode back pressure P reaches the target cathode back pressure TP required to achieve the required output TW is identical in both the first embodiment and the eighth embodiment. Meanwhile, the cathode flow rate L according to the eighth embodiment varies so as to increase earlier than that of the first embodiment, and a timing at which the cathode flow rate L reaches a target cathode flow rate TL required to achieve the required output TW is set at a time t3, which is earlier than the time t2 at which the cathode flow rate L reaches the target cathode flow rate TL according to the first embodiment.

Variation in the output W according to the eighth embodiment is as shown in the drawing, and a timing at which the output W of the fuel cell 20 reaches the required output TW is set at a time t4, which is earlier than the time t2 according to the first embodiment. In other words, the timing at which the output W reaches the required output TW is earlier than the time t2 at which the cathode back pressure P reaches the target cathode back pressure TP. A shaded part in the drawing denotes a power increase Wadd relative to the first embodiment, which is obtained by advancing the timing at which the output W reaches the required output TW. The power increase Wadd is defined so as to match the battery charge/discharge amount determined in step S850. In other words, in step S860 of FIG. 14, a manner in which the cathode back pressure P and the cathode flow rate L are varied (a variation speed/a delay time) is determined such that the output W varies as shown in FIGS. 15 and 16.

After executing step S860, the control unit 60 executes the cathode back pressure control processing (step S870) and cathode flow rate control processing (step S880). In the cathode back pressure control processing and the cathode flow rate control processing, the cathode back pressure P and the cathode flow rate L are controlled in accordance with the variation manner determined in step S860. The cathode back pressure control processing is realized by an identical processing routine to that of the first embodiment. Note that the cathode back pressure control processing according to the first embodiment may be replaced with the cathode back pressure control processing according to the second embodiment. In the cathode flow rate control processing, the cathode flow rate is controlled by varying the rotation speed of the motor M1 for the air compressor 31. In the drawing, step S880 is executed after executing-step S870, but this is for ease of illustration, and in actuality, step S870 and step S880 are executed in parallel.

After step S870 and step S880 are executed, the total control processing is temporarily terminated. On the other hand, when it is determined in step S840 that the SOC is within the appropriate range, the processing is advanced to step S870 in order to execute the cathode back pressure control processing and the cathode flow rate control processing without executing steps S850 and S860.

With the fuel cell system according to the eighth embodiment having the above configuration, similarly to the fuel cell system 10 according to the first embodiment, the required output TW can be secured more reliably, and as a result, the power generation performance can be improved. Moreover, with the fuel cell system according to the eighth embodiment, the output W of the fuel cell reaches the required output TW at an earlier timing than a timing at which the cathode back pressure P reaches the target cathode back pressure TP, and therefore surplus power corresponding to the power increase Wadd can be obtained. The battery charge/discharge amount is then supplemented with this surplus. As a result, a balance between demand and supply of power can be maintained throughout the entire fuel cell system.

Note that in the eighth embodiment, the battery is determined to be in an unfavorable condition when the SOC deviates from the appropriate range, but the invention is not necessarily limited thereto. The battery may be determined to be in an unfavorable condition from another condition as long as, when the battery is in an unfavorable condition, the cathode flow rate L is increased at an early timing in order to, provide the supplementary power required to improve the condition of the battery.

Further, the manner in which the cathode back pressure P and the cathode flow rate L are varied is not limited to the patterns shown in FIGS. 15 and 16, and as long as the power increase Wadd is obtained in comparison with the first embodiment, the variation speed and the delay time may differ from those shown in FIGS. 15 and 16.

Ninth Embodiment

A fuel cell system according to a ninth embodiment differs from the fuel cell system 10 according to the eighth embodiment only in the total control processing executed by the control unit, and is identical thereto in all other software and hardware configurations. Since the hardware configuration of the ninth embodiment is identical to that of the eighth embodiment, and therefore the first embodiment, identical reference symbols to those used in the first embodiment have been allocated to the respective constituent elements in the following description.

Figure 17:
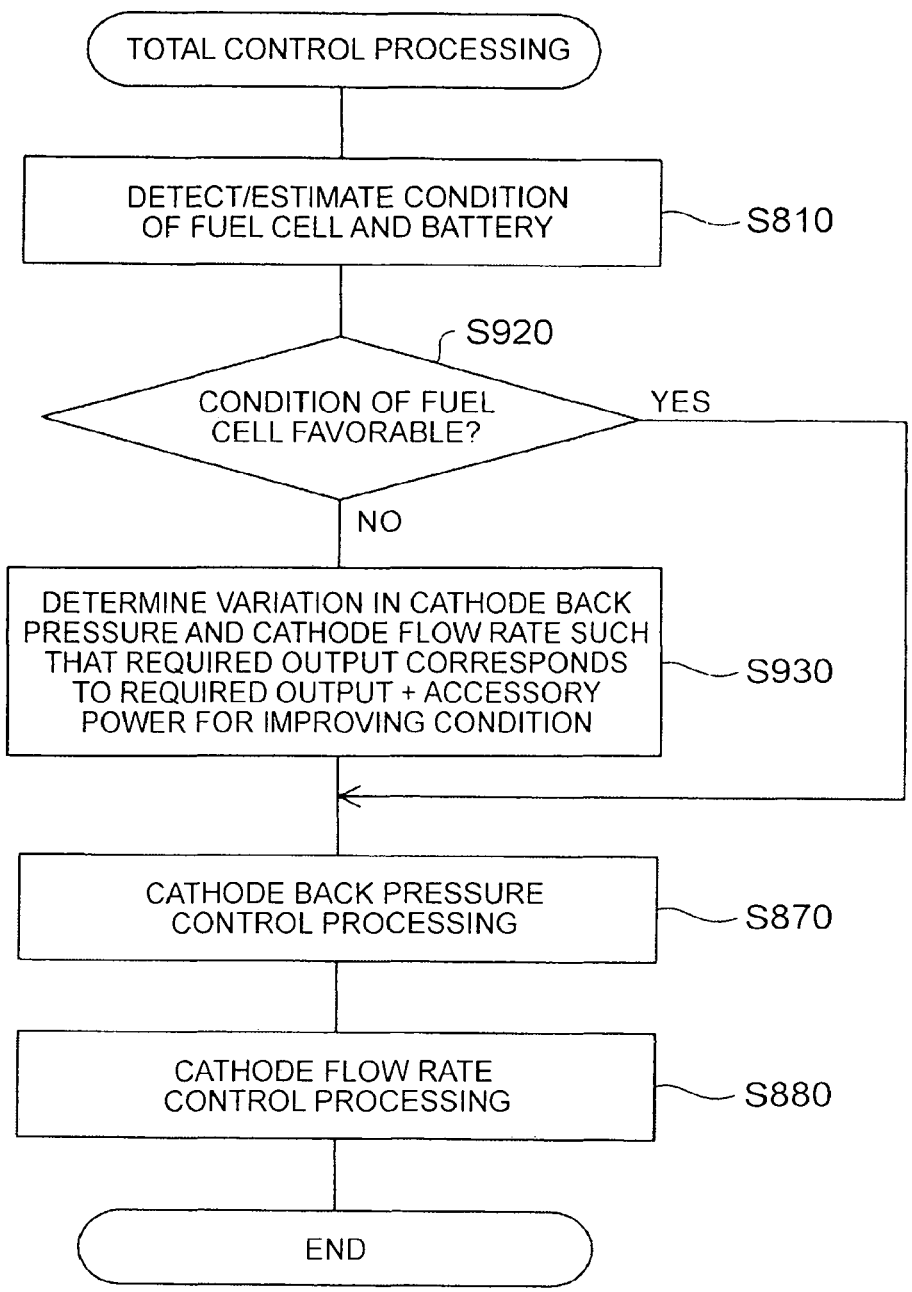
FIG. 17 is a flowchart showing total control processing according to a ninth embodiment.

FIG. 17 is a flowchart showing the total control processing according to the ninth embodiment. The total control processing is executed repeatedly by the control unit 60 at predetermined time intervals. This total control processing includes identical steps S810, S870, and S880 to the total control processing according to the eighth embodiment, shown in FIG. 14, but differs therefrom in that steps S920 to S930 are provided in place of steps S820 to S860 of FIG. 14. The control unit 60 determines whether or not the condition of the fuel cell 20 is favorable on the basis of the condition of the fuel cell 20 estimated in step S810 (step S920). When it is determined here that the condition of the fuel cell is not favorable, variation in the cathode back pressure and the cathode flow rate is determined such that the required output TW required of the fuel cell 20 reaches a magnitude raised (increased) by an amount of power of an accessory that is operated to improve the condition of the fuel cell 20 (step S930). Here, the manner in which the cathode back pressure P and the cathode flow rate L are varied (the variation speed/the delay time) is determined such that the power increase Wadd shown in FIG. 16 matches the power of the operated accessory.

After executing step S930, the control unit 60 executes the cathode back pressure control processing (step S870) and the cathode flow rate control processing (step S880). In the cathode back pressure control processing and the cathode flow rate control processing, the cathode back pressure P and the cathode flow rate L are controlled in accordance with the variation manner determined in step S930. After step S880 is executed, the total control processing is temporarily terminated. When it is determined in step S920 that the condition of the fuel cell 20 is favorable, on the other hand, the processing is advanced to step S870 without executing step S930.

With the fuel cell system according to the ninth embodiment having the above configuration, similarly to the fuel cell system 10 according to the first embodiment, the required output TW can be secured more reliably, and as a result, the power generation performance can be improved. Moreover, with the fuel cell system according to the ninth embodiment, the output W of the fuel cell reaches the required output TW at an earlier timing than a timing at which the cathode back pressure P reaches the target cathode back pressure TP, and therefore surplus power corresponding to the power increase Wadd can be obtained. The power of the accessory that is operated in order to improve the condition of the fuel cell 20 is then supplemented with this surplus. As a result, a balance between demand and supply of power can be maintained throughout the entire fuel cell system.

Tenth Embodiment

A fuel cell system according to a tenth embodiment differs from the fuel cell system 10 according to the eighth embodiment only in the total control processing executed by the control unit, and is identical thereto in all other software and hardware configurations. Since the hardware configuration of the tenth embodiment is identical to that of the eighth embodiment, and therefore the first embodiment, identical reference symbols to those used in the first embodiment have been allocated to the respective constituent elements in the following description.

Figure 18:
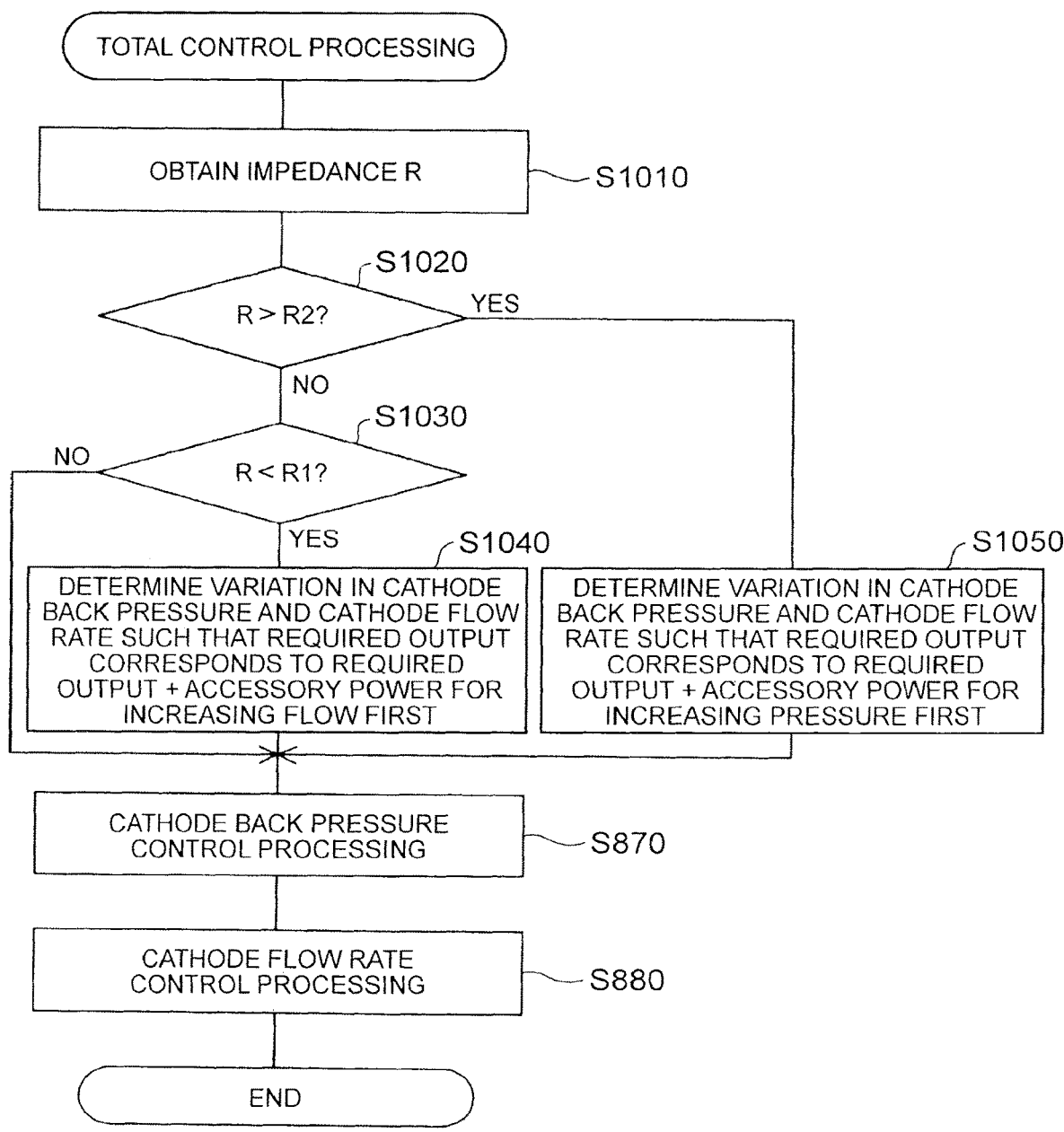
FIG. 18 is a flowchart showing total control processing according to a tenth embodiment.

FIG. 18 is a flowchart showing the total control processing according to the tenth embodiment. The total control processing is executed repeatedly by the control unit 60 at predetermined time intervals. As shown in the drawing, when the processing is started, first, the control unit 60 obtains the impedance R (step S1010). The impedance R is obtained by dividing the voltage detected by the voltage sensor 2b by the current detected by the current sensor 2a.

Next, the control unit 60 determines whether or not the obtained impedance R is larger than a second predetermined value R2 (step S1020) and determines whether or not the impedance R is smaller than a first predetermined value R1 (<R2) (step S1030). The first predetermined value R1 and the second predetermined value R2 take identical values to the third embodiment. When it is determined in step S1020 and step S1030 that the impedance R is within an appropriate range (R2≤R≤R1) extending from the first predetermined value R1 to the second predetermined value R2 (negative determinations in both S1020 and S1030), the processing is advanced to step S870. In steps S870 and S880, the cathode back pressure control processing and the cathode flow rate control processing are executed in an identical manner to the eighth embodiment, shown in FIG. 14.

When it is determined in step S1030 that the impedance R is smaller than the first predetermined value R1, on the other hand, an amount of moisture is determined to be excessively large (i.e. flooding is determined to have occurred), and therefore the control unit 60 advances the processing to step S1040. In step S1040, the control unit 60 determines the manner in which the cathode back pressure P and the cathode flow rate L are varied (the variation speed/the delay time) similarly to the eighth and ninth embodiments such that the cathode flow rate L reaches the target cathode flow rate TL at an earlier timing than a timing at which the cathode back pressure P reaches the target cathode back pressure TP. The power increase Wadd (FIG. 16) obtained by increasing the cathode flow rate L first in this manner is matched to the power of an accessory that is operated in order to improve the flooding condition.

Meanwhile, when it is determined in step S1020 that the impedance R is larger than the second predetermined value R2, the amount of moisture is determined to be excessively small (i.e. the fuel cell is determined to have dried up), and therefore the processing is advanced to step S1050. In step S1050, a cathode control method is determined such that the timing at which the cathode back pressure P reaches the target cathode back pressure TP is earlier than the timing at which the cathode flow rate L reaches the target cathode flow rate TL. In other words, the relationship between the cathode back pressure P and the cathode flow rate L is reversed from that of the eighth embodiment such that the manner in which the cathode back pressure P is varied matches 26 the manner in which the "cathode flow rate L" varies in FIG. 16 and the manner in which the cathode flow rate L is varied matches the manner in which the "cathode back pressure P" varies in FIG. 16. Accordingly, the timing at which the cathode flow rate L reaches the target cathode flow rate TL corresponds to the time t2, and the timing at which the cathode back pressure P reaches the target cathode back pressure TP corresponds to the time t3, which is earlier than the time t2. The power increase obtained by increasing the cathode back pressure P first in this manner is matched to the power of an accessory that is operated in order to improve the dried up condition.

After executing step S1040 or step S1050, similarly to when a negative determination is made in step S1030, the control unit 60 advances the processing to step S870. By executing steps S870 and S880, the cathode back pressure P and the cathode flow rate L are varied in the manner determined in step S1040.

With the fuel cell system according to the tenth embodiment having the above configuration, similarly to the fuel cell system 10 according to the first embodiment, the required output TW can be secured more reliably, and as a result, the power generation performance can be improved. Moreover, with the fuel cell system according to the tenth embodiment, the output W of the fuel cell reaches the required output TW at an earlier timing than a timing at which the cathode back pressure P reaches the target cathode back pressure TP, and therefore surplus power corresponding to the power increase Wadd can be obtained. The power of the accessory required to improve the flooding condition is then supplemented with this surplus. As a result, a balance between demand and supply of power can be maintained throughout the entire fuel cell system. Furthermore, when the fuel cell dries up, the dried up condition can be improved, and therefore the balance between demand and supply of power can be maintained likewise throughout the entire fuel cell system.

Note that the respective embodiments from the eighth embodiment to the tenth embodiment may be combined. More specifically, two embodiments selected from the eighth embodiment to the tenth embodiment may be combined, or all three embodiments may be combined.

The invention is not limited to the first to tenth embodiments and the modified examples thereof described above, and may be implemented in various forms within a scope that does not depart from the subject matter thereof. For example, following modifications may be implemented.

Modified Example 1

In the above embodiments, the cathode back pressure sensitivity S serving as a pressure sensitivity is determined on the basis of the pressure (the cathode back pressure) of the oxidant gas discharged from the fuel cell 20, but instead, the pressure sensitivity may be determined on the basis of the pressure of the oxidant gas supplied to the fuel cell 20. The pressure sensitivity may also be determined on the basis of the pressure of the oxidant gas in an oxidant gas flow passage provided in a cell of the fuel cell. Further, the pressure sensitivity may be determined on the basis of a pressure difference between an oxidant gas supply port and an oxidant gas discharge port.

Modified Example 2

In the above embodiments, the fuel cell is a solid polymer type fuel cell, but may be a type of fuel cell other than a solid polymer type fuel cell.

Modified Example 3

In the above embodiments, the fuel cell system to which the invention is applied is installed in a vehicle such as an automobile, but may be installed in various moving bodies (a motorcycle, a ship, an aircraft, a robot, or the like, for example) as well as a vehicle. Moreover, the invention is not limited to a fuel cell system installed in a moving body, and may also be applied to a stationary fuel cell system or a portable fuel cell system.

Modified Example 4

In the above embodiments and modified examples, functions realized by software may be realized by hardware such as discrete electronic circuits, for example.

The invention may be realized as a vehicle installed with the fuel cell system according to the invention, a computer program or a storage medium for causing a computer to realize functions corresponding to steps of a control method for the fuel cell system according to the invention, and so on.

The invention claimed is:

1. A fuel cell system comprising:
a fuel cell;
an oxidant gas supply unit configured to supply an oxidant gas to a cathode electrode of the fuel cell; and
a gas pressure control unit configured to detect as a gas pressure sensitivity a ratio of variation in an output of the fuel cell to variation in the pressure of the oxidant gas, specify a correspondence relationship between the pressure of the oxidant gas and the output of the fuel cell on the basis of the detected gas pressure sensitivity, and control the pressure of the oxidant gas on the basis of the specified correspondence relationship, wherein:
the fuel cell includes an electrode catalyst;
the correspondence relationship between the pressure of the oxidant gas and the output of the fuel cell includes a first correspondence relationship and a second correspondence relationship, the second correspondence relationship being set such that a magnitude of the pressure of the oxidant gas in the second correspondence relationship, corresponding to an identical output of the fuel cell, is greater than that a magnitude of the pressure of the oxidant gas in the first correspondence relationship, and
the gas pressure control unit is configured to specify the correspondence relationship by selecting the first correspondence relationship when the fuel cell is not in a predetermined operating condition in which a utilization rate of platinum contained in the electrode catalyst decreases, and selecting the second correspondence relationship when the fuel cell is in the predetermined operating condition.

2. The fuel cell system according to claim 1, wherein the predetermined operating condition is a flooded condition of the fuel cell.

3. The fuel cell system according to claim 1, wherein the predetermined operating condition is an idling condition of the fuel cell.

4. The fuel cell system according to claim 1, further comprising a non-volatile memory configured to continue to store a characteristic curve, specified by the gas pressure control unit, after a power supply of the fuel cell system has been switched OFF,
wherein the gas pressure control unit is configured to control the pressure of the oxidant gas within a predetermined period on the basis of the characteristic curve stored in the non-volatile memory.

5. The fuel cell system according to claim 1, further comprising:
a battery, wherein a predetermined range of a state of charge of the battery varies according to a condition of the fuel cell; and
a gas flow rate control unit configured to control a flow rate of the oxidant gas such that when the gas pressure control unit controls the pressure of the oxidant gas while the battery is in a predetermined condition, the output of the fuel cell reaches a required output at an earlier timing than a timing at which the pressure of the oxidant gas reaches a target gas pressure.

6. The fuel cell system according to claim 5, further comprising a SOC detection unit configured to detect a state of charge of the battery,
wherein the battery is determined to be in the predetermined condition when the detected state of charge deviates from the predetermined range.

7. The fuel cell system according to claim 1, further comprising a gas flow rate control unit configured to control a flow rate of the oxidant gas such that when the gas pressure control unit controls the pressure of the oxidant gas while the fuel cell is in a predetermined condition, the output of the fuel cell reaches the required output at an earlier timing than a timing at which the pressure of the oxidant gas reaches a target gas pressure.

8. The fuel cell system according to claim 7, wherein the fuel cell is determined to be in the predetermined condition when flooding occurs in the fuel cell.

* * * * *